US009497638B2

(12) United States Patent
Wirola et al.

(10) Patent No.: US 9,497,638 B2
(45) Date of Patent: Nov. 15, 2016

(54) SCREENING INFORMATION FOR A COVERAGE MODEL

(75) Inventors: Lauri Aarne Johannes Wirola, Tampere (FI); Tommi Antero Laine, Tampere (FI); Matti Samuli Raitoharju, Tampere (FI); Niilo Torsten Sirola, Tampere (FI)

(73) Assignee: Nokia Technologies Oy, Espoo (FI)

( * ) Notice: Subject to any disclaimer, the term of this patent is extended or adjusted under 35 U.S.C. 154(b) by 603 days.

(21) Appl. No.: 13/202,591

(22) PCT Filed: Mar. 4, 2009

(86) PCT No.: PCT/US2009/001430
§ 371 (c)(1),
(2), (4) Date: Aug. 22, 2011

(87) PCT Pub. No.: WO2010/101550
PCT Pub. Date: Sep. 10, 2010

(65) Prior Publication Data
US 2011/0307428 A1    Dec. 15, 2011

(51) Int. Cl.
| G06F 15/00 | (2006.01) |
| G06F 15/18 | (2006.01) |
| H04W 16/18 | (2009.01) |
| H04L 12/24 | (2006.01) |
| H04W 4/02 | (2009.01) |

(52) U.S. Cl.
CPC .......... *H04W 16/18* (2013.01); *H04L 41/145* (2013.01); *H04W 4/02* (2013.01)

(58) Field of Classification Search
CPC .............. G01S 19/11; G01S 1/68; E02F 9/205; E02F 9/2054; E02F 9/262; E02F 9/265; E02F 9/268; G06F 15/00; G06F 15/18; H04W 64/00; H04W 24/00; H04W 84/18; H04B 17/318; H04B 7/0452
USPC ................. 455/456.1, 574; 706/12; 370/338
See application file for complete search history.

(56) References Cited

U.S. PATENT DOCUMENTS

| 5,519,760 A * | 5/1996 | Borkowski ........... H04W 64/00 340/8.1 |
| 7,158,484 B1 * | 1/2007 | Ahmed ................. H04W 72/02 370/254 |
| 2005/0192031 A1 | 9/2005 | Vare |
| 2006/0129607 A1 | 6/2006 | Sairo et al. |
| 2007/0050137 A1 * | 3/2007 | Woon et al. .................. 701/219 |

(Continued)

FOREIGN PATENT DOCUMENTS

EP    1796419    6/2007

OTHER PUBLICATIONS

'PNaFF: a Modular Software Platform for Testing Hybrid Position Estimation Algorithms': Raitoharju, 2008, IEEE, 978-1-4244-1799, pp. 137-141.*

(Continued)

*Primary Examiner* — Kakali Chaki
*Assistant Examiner* — Peter Coughlan
(74) *Attorney, Agent, or Firm* — Locke Lord LLP

(57) ABSTRACT

It is disclosed to determine whether information useable for a generating/updating process that comprises generating and/or updating at least one model for a coverage area of a communication node shall be discarded or made available to said generating/updating process.

20 Claims, 9 Drawing Sheets

(56) References Cited

U.S. PATENT DOCUMENTS

| | | | |
|---|---|---|---|
| 2007/0069923 A1* | 3/2007 | Mendelson | 340/988 |
| 2008/0004042 A1 | 1/2008 | Dietrich et al. | |
| 2008/0045233 A1* | 2/2008 | FitzGerald | 455/456.1 |
| 2008/0113672 A1 | 5/2008 | Karr et al. | |
| 2008/0198820 A1* | 8/2008 | Abdel-Kader | 370/338 |
| 2008/0280624 A1* | 11/2008 | Wrappe | 455/456.1 |

OTHER PUBLICATIONS

'Requirements for the next generation standardized location technology protocol for location-based services': Wirola, JGPS 2008, vol. 7, No. 2, pp. 91-103.*
'Bringing RTK to Cellular Terminals Using a Low-Cost Single-Frequency AGPS Receiver and Inertial Sensors': Wirola, 2006, IEEE, 0-7803-9454-2, pp. 645-652.*
'PNaFF: a Modular Software Platform for Testing Hybrid Position Estimation Algorithms': Raitoharju, 2008, IEEE, 978-1-4244-1799-5, pp. 137-141.*
'Requirements for the next generation standardized location technology protocol for location-based services': Wirola, 2008, Journal of global positioning systems, vol. 7, No. 2: pp. 91-103.*
Notification of Transmittal of International Search Report and Written Opinion (1 page), International Search Report dated Apr. 15, 2009 in International Patent Application No. PCT/US2009/01430 (3 pages) and Written Opinion (4 pages).
U.S. Appl. No. 13/202,603, filed Aug. 22, 2011, Lauri Wirola.
U.S. Appl. No. 13/202,609, filed Aug. 22, 2011, Lauri Wirola.
U.S. Appl. No. 13/202,595, filed Aug. 22, 2011, Lauri Wirola.
U.S. Appl. No. 13/254,271, filed Sep. 1, 2011, Lauri Wirola.
Extended European Search Report for European Application No. 09841235.6, Dated Mar. 22, 2016, 6 pages.

* cited by examiner

SCREENING INFORMATION FOR A COVERAGE MODEL

THE NAMES OF THE PARTIES TO A JOINT RESEARCH AGREEMENT

The claimed invention was made by or on behalf of Tampere University of Tampere, Finland and Nokia Corporation of Espoo, Finland as parties to a joint research agreement that was in effect on or before the date the claimed invention was made.

FIELD

This invention relates to screening information for a coverage model based on a state machine.

BACKGROUND

As an alternative or add-on to satellite-based positioning systems, positioning systems in which a present position of a terminal is estimated based on a list of communication nodes that can presently be heard by the terminal and a database that contains identifiers and positions of the communication nodes and/or models for the coverage areas for a number of communication nodes have gained recent interest.

Given that the communication node positions are known and distances from the terminal to the communication nodes can be estimated, the terminal's position can be estimated through triangulation. Distance between a terminal and the heard communication nodes can be estimated for instance based on either the path loss using a channel model (i.e. how much the signal attenuates between the terminal and the communication node) or based on timing (or round-trip timing) measurements (i.e. information expressing how long signals propagate between terminal and communication node).

Alternatively, if models for the communication node coverage areas are known, then a terminal may pick the coverage areas for the heard communication nodes and find the intersection of these coverage areas. The terminal can then be assigned a position that is, for instance, the center-of-mass of the intersection area. Similarly an error estimate for the position estimate can be given, for example, based on the size of the intersection.

A model for the coverage area of a communication node can for instance be determined by having one or more terminals that are capable of determining their position send reports with their present position and a list of communication nodes that can presently be heard, gathering, for each communication node, the terminal positions reported into a set of terminal positions and deriving, from this set of terminal positions, a model for the coverage area of the communication node.

SUMMARY OF SOME EXEMPLARY EMBODIMENTS OF THE INVENTION

With increasing numbers of reporting terminals and increasing frequency of reporting, a huge amount of reports may have to be processed when determining one or more models for the coverage area of a communication node (or models for the coverage areas of several communication nodes).

According to a first aspect of the present invention, a method is disclosed, comprising determining whether information useable for a generating/updating process that comprises generating and/or updating at least one model for a coverage area of a communication node shall be discarded or made available to the generating/updating process.

According to a second aspect of the present invention, further an apparatus is disclosed, comprising a processor configured to determine whether information useable for a generating/updating process that comprises generating and/or updating at least one model for a coverage area of a communication node shall be discarded or made available to the generating/updating process.

The processor may for instance be implemented in hardware alone, may have certain aspects in software alone, or may be a combination of hardware and software. An exemplary embodiment of the processor may comprise a memory, wherein instructions executed by the processor may be transferable to the memory and/or contained in the memory. Said memory may for instance store a program according to the fourth aspect of the present invention described below, or at least parts thereof.

According to a third aspect of the present invention, furthermore an apparatus is disclosed, comprising means for determining whether information useable for a generating/updating process that comprises generating and/or updating at least one model for a coverage area of a communication node shall be discarded or made available to the generating/updating process.

An example for the means for determining whether the information shall be discarded or made available to the generating/updating process is a processor configured to determine whether the information shall be discarded or made available to the generating/updating process, but the means is not limited thereto.

The apparatuses according to the second and third aspect of the present invention may for instance be a server or a part thereof, for instance a server in a system that collects positions reported from terminals and/or generates and/or updates models for the coverage areas of communication nodes, wherein such models may be provided to terminals to enable them to perform fingerprint-based positioning (i.e. position finding). The apparatuses may for instance further comprise a memory, IP connectivity and/or a user interface.

According to a fourth aspect of the present invention, further a program is disclosed, comprising program code for performing the method according to the first aspect of the present invention and all exemplary embodiments (described below) thereof, when the program is executed on a processor.

The program may for instance be distributed via a network, such as for instance the Internet.

The program may for instance be stored or encoded on a readable-medium, for instance a computer-readable or processor-readable medium. The readable medium may for instance be embodied as an electric, magnetic, electromagnetic, optic or other storage medium, and may either be a removable medium or a medium that is fixedly installed in an apparatus or device. The readable medium may for instance be a tangible medium, for instance a tangible storage medium.

According to the present invention, the communication node may for instance be a communication node of a communication system. It may then for instance provide coverage for one or more terminals. The communication system may be a wireless or a wire-bound communication system, and may be of cellular or non-cellular type. The communication node may for instance be a one-directional or two-directional communication node. Non-limiting examples of the communication node as understood in this specification are thus a cellular base station, a Wireless Local Area Network (WLAN) access point, a Bluetooth station, an FM radio station, and a TV station. The communication node may be fixed or mobile, for instance with low mobility and/or velocity. In case of sectorization of cells, each sector may also be understood as a communication node given that the sectors can uniquely be identified, even if all sectors are controlled by the same (cellular) base station.

The communication node has a coverage area, which may be understood as an area within which (fixed or mobile) terminals are able to receive signals sent from the communication node at least with a pre-determined minimum quality, wherein the quality may for instance be expressed in terms of signal strength or signal-to-noise-ratio, to name but a few examples. In case of a wireless communication node, the coverage area may for instance depend on the transmission frequency and the propagation environment, which may for instance cause shadowing. The coverage area does not necessarily have to be continuous, it may equally well have recesses and may equally well consist of several sub-areas.

The information is useable for a generating/updating process that comprises generating and/or updating at least one model for the coverage area of the communication node.

This generating/updating process may for instance generate/update one or more models for the coverage area of the communication node based on a collection of reports from one or more terminals that report their position and a list of one or more communication nodes that can be heard at that position. Therein, a terminal may for instance be considered to "hear" a communication node if it is able to receive one or more signals, which are sent by the communication node, with a pre-defined minimum quality, wherein said quality may for instance be defined in terms of a signal-to-noise ratio or a signal-to-noise and interference ratio. An example of such a signal sent by a communication node may for instance be a broadcast channel. As an alternative, said terminal may for instance be considered to "hear" a communication node if the terminal is capable of at least partially receiving and correctly decoding one or more signals sent by the communication node, such as a broadcast channel. For instance, the terminal may be considered to "hear" the communication node if it is at least able to decode an identification of the communication node (e.g. a MAC address or any other type of communication node identification). The information which communication nodes a terminal can hear may for instance result from a scanning/sniffing operation performed by the terminal.

From such reports, a base-station-specific list of terminal positions may be derived, and a model for the coverage area of each communication node may then for instance be obtained based on a geometrical object (such as an ellipse, a rectangle, a polygon, a circle, etc.) that is representative of all base-station-specific terminal positions. Therein, said geometrical model may for instance be a hard boundary for the terminal positions, so that all terminal positions have to be within the geometrical object. Equally well, the geometrical object may be a soft statistical boundary that is for instance based on a statistical model for the distribution of the terminal positions in the coverage area and is characterized by further parameters such as for instance a confidence value. The geometrical object may then be considered to be representative of all base-station-specific terminal positions even if it does not enclose all of these terminal positions.

The model (for instance its parameters and optional further parameters) may then be provided (optionally together with corresponding models for coverage areas of further communication nodes) to one or more terminals to enable them to perform positioning (i.e. position finding). In addition to such a model, further models for the coverage area of the communication node may be determined based on the base-station-specific terminal positions, for instance simpler models (e.g. models that require less memory to be stored and/or less bandwidth to be transmitted) and/or models that allow for less complex manipulation (for instance less complex checking if a position is covered by a model).

Consequently, the information useable for the generating/updating process may for instance at least contain a position of a terminal that is within a coverage area of the communication node, but may equally well contain more information. For instance, the information may be or be derived from one or more reports that contain a position of one or more terminals that are able to hear the communication node, i.e. are within the coverage area of the communication node. The one or more reports in turn may be derived from one or more so-called fingerprints, which contain a position of a terminal and a list of all communication nodes that can be heard by the terminal.

The generating/updating may be performed by the same unit that performs the determining whether information shall be discarded or made available to the generating/updating process, or by another unit.

It is determined if the information shall be discarded or made available to the generating/updating process. The determining may for instance be performed by a pre-processing/pre-filtering unit that receives the information (for instance in the form of fingerprints or reports) and either discards or maintains the information, for instance to reduce an amount of information that has to be processed by the generating/updating process.

The information that has been determined to be not discarded is made available to the generating/updating process, for instance by storing this information to a storage unit where it can be retrieved by the generating/updating process, or by directly forwarding this information to the generating/updating process, to name but a few examples.

Since only the information that has been determined to be not discarded is made available to the generating/updating process, an amount of information that has to be dealt with by the generating/updating process may be vastly reduced, depending on the criteria applied in the determining whether the information shall be discarded or maintained. For instance, only information that is considered to be of significance for the generating/updating may be determined to be not discarded. This pre-filtering of information may allow for a more efficient use of the available resources of a fingerprint collection system.

According to an exemplary embodiment of all aspects of the present invention, the determining is based on at least one model for the coverage area of the communication node produced by the generating/updating process. The at least one model may for instance be a model that is to be provided to terminals to enable them to perform positioning (i.e. position finding) or a representation thereof. The at least one model may equally well be derived from a model that is to be provided to terminals to enable them to perform positioning or from a representation of such a model.

The determining may comprise checking if a position contained in the information is covered by the at least one model on which the determining is based and discarding the information or making the information available to the generating/updating process at least partially based on an outcome of the checking. The position may for instance be a position of a terminal within the coverage area of the communication node, for instance the position of the terminal at a time instant (or close to such a time instant) when the terminal is (or is considered to be) within the coverage area of the communication node, for instance when the terminal is able to hear the communication node. In case that the at least one model represents a hard boundary for the coverage area, the position may be understood to be covered by the at least one model if the position is within an area defined by the coverage model. Equally well, in case that the at least one model represents a soft statistical boundary for the coverage area, other criteria may be applied to determine if the position may be understood to be covered by the at least one model. For instance, if the at least one model is based on the assumption that the positions are distributed in the coverage area according to a Gaussian distribution, a position may for instance be considered to be covered by the at least one model if it is within the 2D 1σ area of the coverage area, or within any other area definable by a confidence value. The position of the terminal may for instance be reported by the terminal, for instance together with an identification of the communication node and optionally further parameters. All information reported by the terminal may then be considered as the information that contains the position. The position of the terminal may for instance be reported in a so-called fingerprint, which comprise the position of the terminal and a list of the communication nodes in the coverage area of which the terminal is determined to be, i.e. a list of the communication nodes that can be heard by the terminal, and optionally further parameters as indicated above. Such a fingerprint thus provides a position of the terminal for several communication nodes at a time. Equally well, a fingerprint may contain a batch of positions of the terminal and associated communication node identifications, for instance gathered during a certain amount of time. It may also be the case that the position of the terminal is derived from one or more fingerprints that only contain a list of the communication nodes heard by the terminal. The position reported by the terminal may, in rare cases, also be a position outside the coverage area, in particular when the measurement of the position by the terminal is erroneous.

The information may for instance be discarded if a position contained in the information is covered by the at least one model on which the determining is based. Otherwise, the information may be maintained, i.e. only the information containing a position covered by the at least one model on which the determining is based may be discarded. Information containing a position that is already covered by the at least one model for the coverage area of the communication node may be considered insignificant for the generating/updating process and may thus be discarded.

The generating/updating process, in addition to the at least one model on which the determining is based, may produce at least one further model that differs from the at least one model on which the determining is based at least in its format. For instance, both the model on which the determining is based and the at least one further model may be models that are or are based on elliptical models, but they may use respectively different formats (e.g. a matrix-form ellipse for the model on which the determining is based and a model that at least comprises centre coordinates, length of major and minor semi-axes and orientation of the semi-major axis or semi-minor axis of an ellipse for the at least one further model). Equally well, the model on which the determining is based may be an elliptical (or circular) model, and the at least one further model may be a rectangular model. Nevertheless, the model on which the determining is based may be derived or derivable from the at least one further model.

The checking if the position is covered by the at least one model on which the determining is based may be less complex than a checking if the position is covered by the at least one further model. The checking may for instance be less complex since it requires less computation (for instance less operations or less memory). The model on which the determining is based may nevertheless require more memory for storage than the at least one further model.

The at least one further model may for instance be a model that is to be provided to at least one terminal for use in position finding, for instance an elliptical model or a model based on an ellipse (e.g. a model that comprises parameters characterizing an ellipse but also further parameters, for instance including a confidence value that, in case of an ellipse representing a soft statistical boundary for the positions of the coverage area, further characterizes the area described by the ellipse).

Equally well, the at least one further model may be a model that is used to represent and/or store the coverage area of the communication node in the generating/updating process, for instance a polygonal representation of the coverage area, such as a convex hull of a plurality of terminal positions or a polygon derived from a convex hull of the plurality of terminal positions. Therein, the plurality of terminal positions may for instance consist of the terminal positions considered in the generating/updating process so far.

At least one model of the at least one model on which the determining is based may be a rectangular model. The rectangular model may for instance define a rectangular area. The rectangular model may for instance allow for efficient storage and/or for efficient transmission between units and/or may allow for computationally cheap checking if a position is covered by the rectangular model.

The rectangular model may define a rectangle that is considered to be completely within the coverage area of the communication node. The rectangle may for instance be inside an ellipse that is considered to represent the coverage area of the communication node.

Alternatively, the rectangular model may define a rectangle that is considered to completely enclose the coverage area of the communication node. The rectangle may for instance tightly enclose an ellipse that is considered to represent the coverage area of the communication node.

At least one model of the at least one model on which the determining is based may be an elliptical model. The elliptical model may define an elliptical area. The elliptical model may represent a reasonable trade-off between accuracy, complexity and/or storage requirement of a model for a coverage area of a communication node. For instance, an elliptical model may allow for a more accurate approximation of a coverage area of a communication node as compared to a rectangular model, but may require more storage space than a rectangular model, and it may also be computationally more demanding to check if a position is covered by an elliptical model as compared to a rectangular model. The elliptical model may represent a hard boundary or a soft statistical boundary for the positions in the coverage area. Said elliptical model may for instance be a circular model (as a special case of an elliptical model).

The elliptical model may describe an ellipse by the matrix $$A = \begin{bmatrix} a & b \\ b & d \end{bmatrix}$$

with parameters a>0, d>0 and b and the two-dimensional centre position c so that a two-dimensional position x is within the ellipse if $(x-c)^T A(x-c) \leq 1$. This matrix format may for instance represent a hard boundary for the positions in the coverage area, but may equally well be considered to represent a soft statistical boundary, wherein the centre position c represents the mean value and the matrix A represents the covariance matrix, for instance of a (2D) Gaussian distribution assumed for the distribution of the positions in the coverage area. Note that, if the ellipse is considered to represent a hard boundary of the coverage area, the condition $\leq 1$ means that the x is within the coverage area. In contrast, in the case of a soft boundary, the same condition means that x is within the 2D $1\sigma$ area of the coverage area (i.e. the ellipse represents the 2D $1\sigma$ area). This matrix format of the elliptical model may for instance allow for a computationally more efficient checking if a position is covered by the elliptical model as compared to an elliptical model format that represents the same ellipse in terms of the lengths of the semi-major and semi-minor axis, the centre position and the orientation of one of the axes or as compared to a model that is based on such an elliptical model format (for instance a model that adds one or more further parameters to such an elliptical model format). The matrix format may nevertheless require more storage space than the other format.

The at least one further model (generated and/or updated in addition to the at least one model on which the determining is based) may be a model that is defined in terms of at least: centre coordinates, length of the semi-major axis, length of the semi-minor axis and orientation of the semi-major axis or semi-minor axis of an ellipse. This model may comprise further parameters, for instance parameters related to said ellipse. Said model may represent a hard boundary for the positions in the coverage area, i.e. so that a position is only considered to be covered by the model if it is within the ellipse described by the model, or a soft statistical boundary that allows positions to be considered to be covered by the model even if they are outside the ellipse described by the model. In the latter case, the model may for instance comprise a confidence value that describes which area (e.g. a $1\sigma$, $2\sigma$ or $3\sigma$ area of a 2D Gaussian distribution) the ellipse actually describes. As described above, this model may require less storage space than the elliptical model in matrix format, but may involve a more complex checking if a position is covered by the model.

The at least one model of said at least one model on which said determining is based may for instance be a polygonal model. The polygonal model may for instance describe a polygon representing a coverage area. The polygon may for instance be a convex hull for a set of terminal positions or may be derived from a convex hull for a set of terminal positions. The set of terminal positions may for instance comprise terminal positions that have been reported by terminals within the coverage area of the communication node. The form of the polygon may be adaptive to the terminal positions in the set of terminal positions, it may in particular be a not pre-defined form and may not be a pre-defined rectangular or a pre-defined hexagonal form.

The polygonal model may for instance comprise a triangular model, a rectangular model or a hexagonal model as special cases.

According to an exemplary embodiment of all aspects of the present invention, the determining is based on one or more determination rules. The determination rules may for instance define in which cases information shall be discarded and in which cases information shall be made available to the generating/updating process. The determination rules may for instance be based on one or more models for the coverage area of the communication node that have been generated/updated so far (for instance by the generating/updating process) to allow discarding of information that is considered, with respect to these one or more models, to be less significant.

The determining may for instance be based on a state machine, and at least two states of the state machine may be associated with different determination rules of the one or more determination rules, respectively.

The state machine may for instance be a finite state machine. The state machine may be defined by a set of states it can assume and by a regulation between which of the states transitions are possible and which events trigger such transitions.

The state machine may for instance be operated by a unit that implements the generating/updating process, and the current states may be provided to or made available to a unit that implements the determining whether information shall be discarded or made available to the generating/updating process.

Equally well, the state machine may be operated by a unit that implements the determining, for instance based on information received from a unit that implements the generating/updating process. As already stated, both the determining and the generating/updating process may equally well be implemented by the same unit.

At least one state of the state machine may for instance be associated with (for instance corresponds to) a state of at least one of the at least one model for the coverage area of the communication node generated and/or updated by the generating/updating process. This model will be referred to as state-machine-associated model in the following. Equally well, more than one (for instance all) states of the state machine may be associated with respective states of the state-machine-associated model. For instance, at least two different states of the state machine may be associated with two different respective states of the state-machine-associated model or of a model that is derived from the state-machine associated model.

The state-machine-associated model may for instance be a polygonal, elliptical or rectangular model for the coverage are of the communication node. It may for instance be a model that is used to represent positions of terminals within the generating/updating process and serves as a basis for all models generated/updated by the generating/updating process, or a model that is to be provided to at least one terminal to enable the terminal to perform positioning (i.e. position finding).

The states of the state-machine-associated model may for instance be related to the generating/updating process.

Non-limiting examples of states of the state-machine-associated model are initial, maturing, stable, dubious and ghost. Therein, in the initial state, for instance no model (or at least not the state-machine-associated model) for the coverage area of the communication node has been generated or has been successfully generated so far. In the maturing state, for instance the state-machine-associated model has already been generated (or a representation of the state-machine-associated model has been successfully generated), but is not considered to be complete. In the stable state, for instance the state-machine-associated model has already been generated and is considered to be complete. In the dubious state, for instance the state-machine-associated model has already been generated, but is considered to be potentially wrong. In the ghost state, for instance the state-machine-associated model has already been generated, but is considered to be outdated, or it has not been possible to generate a model (or at least not the state-machine-associated model) at all due to lack of reports.

At least two states are associated with different determination rules, respectively. Therein, the same determination rule may be associated with more than one state. However, there may be at least two different states that are associated with two different determination rules, respectively, i.e. a first state is associated with a first-type determination rule and a second state (that is different from the first state) is associated with a second-type determination rule that is different from the first-type determination rule. Associating determination rules with the states of the state machine may allow adapting the determining whether the information shall be discarded or made available to the generating/updating process to the states of the state machine. For instance, at least two different states of the state machine may be associated with different respective information needs of the generating/updating process, and then, associating determination rules with the states of the state machine may allow adapting the determining whether the information shall be discarded or made available to the generating/updating process to the information needs of the generating/updating process. The information need may for instance be characterized by an amount and/or type of information required. Definition of a type of information may for instance be based on one or more criteria the information has to fulfill in order to be considered to be of this type. These criteria may for instance be based on one or more models for the coverage area of the communication node. For instance, in an initial state, the generating/updating process may require any information related to the at least one model for the coverage area of the communication node to allow generation of a model for the coverage area as soon as possible. As a further example, in a stable state, only few and/or specific information, for instance information allowing checking if the coverage area has changed, is required by the generating/updating process.

According to exemplary embodiments of all aspects of the present invention, transitions between at least two states of the state machine are triggered by events related to at least one property of at least one of the at least one model for the coverage area of the communication node. Therein, the at least one of the at least one model for the coverage area of the communication node may for instance be the state-machine-associated model introduced above, but may equally well be a different model or a different representation of the state-machine-associated model.

The at least one property may for instance be one of an availability, a consistency, a stability, a lack of reliability and a lack of actuality of the at least one model for the coverage area of the communication node. For instance, a transition may be triggered when at least one model becomes available, or when at least one model is considered to be consistent or stable or when at least one model is considered to be unreliable.

Examples of state transitions within the context of the exemplary states of the state-machine-associated model introduced above are as follows. An initial state may for instance be entered as soon as a first (valid) model (e.g. the state-machine-associated model or a representation thereof) has been produced and thus is available and may be maintained until no further changes occur in the model for a pre-defined period of time, in which case a transition to the stable state may then occur, since the model is considered stable. The dubious state may for instance be entered when potential outliers occur, so that reliability of the model becomes questionable, and may be maintained until a model for the coverage area fulfills one or more pre-defined criteria (for instance consistency criteria). Therein, an outlier may for instance be defined as a terminal position that is too far apart from the coverage area of the communication node, for instance since it has a distance with respect to the coverage area that is above a distance threshold. An outlier may for instance occur when a terminal that is actually within the coverage area measures or reports its position erroneously. A position may be classified as a potential outlier if it is considered to be too far apart from the assumed coverage area of the communication node, for instance since it has a distance with respect to the assumed coverage area that is above a distance threshold, wherein the assumed coverage area of the communication node may for instance be represented by a model for said coverage area. The ghost state may be entered when an already determined model (e.g. the state-machine-associated model) is considered to lack actuality, for instance because it is not confirmed by any information received, or if it is not possible to generate a model for the coverage area of the communication node (e.g. at least the state-machine-associated model) at all due to lack of information, but is anyhow known that the communication node exists or has existed in the past.

According to exemplary embodiments of all aspects of the present invention, transitions between at least two states of the state machine are controlled by at least one of a monitoring process that monitors at least one of a stability and an actuality of at least one of the at least one model for the coverage area of the communication node, an outlier detection process that detects potential outliers with respect to the coverage area of the communication node and the generating/updating process. The monitoring process and/or the outlier detection process and/or the generating/updating process may for instance issue events that trigger the state transitions. The at least one of the at least one models may for instance be the state-machine-associated model introduced above, but may equally well be a different model. The outlier detection process may for instance be a part of the generating/updating process. The outlier detection process may for instance determine whether a position contained in information useable in the generating/updating process is to be considered as a potential outlier with respect to the coverage area of the communication node or not. This determining may for instance be based on at least one of the at least one model produced by the generating/updating process, or on pre-defined information such as an assumed maximum radius of a coverage area.

A first exemplary determination rule of the one or more determination rules may require that no information shall be discarded. The information then may be made available to the generating/updating process without any need for checking further conditions. The determining whether information shall be discarded or made available to the generating/updating process may then be considered to be represented by determining if the first exemplary determination rule shall be applied or not.

The at least one state in which the first exemplary determination rule is applied may for instance be a state in which no model for the coverage area of the communication node has been generated so far (e.g. an initial state), or a state in which at least one model for the coverage area of the communication node is considered to be outdated (e.g. a ghost state).

The model for the coverage area of the communication node may not have been generated so far because the coverage area is a new coverage area (the state may then for instance be a so-called INITIAL state). A model for the coverage area of the communication node may be considered to be outdated for instance because for a pre-defined period of time, no information with respect to the coverage area has been received (the state may then for instance be a so-called GHOST state). This determination rule may also be applied in case that it is assumed that a coverage area has changed or moved somehow. In such a case, it may be that all the information is maintained in order to collect evidence of change.

A second exemplary determination rule of the one or more determination rules may require that the information shall be discarded if the position contained in the information is covered by a first-type model for the coverage area of the communication node produced by the generating/updating process, that the information shall be discarded if the position contained in the information is not covered by the first-type model but is covered by a second-type model for the coverage area of the communication node generated and/or updated by the process, and that the information shall be made available to the generating/updating process otherwise.

Therein, the first-type model and the second-type model are understood to differ from each other, for instance with respect to the area defined. The first-type model may for instance allow a pre-selection of information to be discarded, which may allow sorting out a vast amount of information, and the information that passes this pre-selection then is checked with respect to the second-type model that may allow a more refined analysis.

The first-type model may for instance be a rectangular model. A rectangular model may allow only a coarse approximation of the coverage area of the communication node, but may also allow checking whether a position is covered by the rectangular model with low computational complexity (as for instance compared to polygonal, elliptical or circular models). The rectangular model thus may be particularly suited as a pre-filter for sorting out vast amounts of information with low computational complexity.

The second-type model may for instance be an elliptical model. The elliptical model may allow modeling a coverage area of a communication node with increased accuracy compared to, for instance, a rectangular model. The first-type model may then for instance be a rectangular model obtained by fitting a rectangle representing the rectangular model into an ellipse representing the elliptical model. The elliptical model may for instance be a representation of a model for the coverage area of the communication node that is to be provided to one or more terminals for positioning purposes. This choice of the first-type and the second-type model for the coverage area may be based on the insight that a position covered by the rectangular model is in any case also covered by the elliptical model. Thus when actually targeting to check whether a position is covered by the ellipse (and discarding the positions covered by the ellipse, since they are considered insignificant in view of the current state of the state machine), it can first be checked if the position is covered by the rectangle (inscribed into the ellipse), since this check is computationally less complex and sorts out a large number of positions that then do not have to be checked with respect to the ellipse. Then it has to be checked only for the positions that are not covered by the rectangle whether they are covered by the ellipse or not.

Therein, a state of the state machine associated with the second exemplary determination rule may be a state in which the at least one model for the coverage area of the communication node produced by the generating/updating process is considered to be not based on enough information yet (e.g. a maturing state), or a state in which the coverage area is considered to have changed or moved (e.g. a dubious state).

The former state may for instance be entered as soon as a first (valid) model for the coverage area of the communication node has been produced and may be maintained until no further changes occur in the model for a pre-defined period of time. The latter state may for instance be entered when potential outliers (for instance more than a pre-defined number) with respect to an already determined model for the coverage area occur and may be maintained until a model for the coverage area is no longer considered to be potentially wrong.

A third exemplary determination rule of the one or more determination rules may require that the information shall be made available to the generating/updating process if the position contained in the information is not covered by a model for the coverage area of the communication node produced by the generating/updating process and that, if the position is covered by the model, the information shall be discarded randomly according to a pre-defined probability criterion and otherwise made available to the generating/updating process. While positions not covered by the model may all be significant, this may not hold for positions covered by the model. For instance, some positions covered by the model may be significant, and others may be not. To take this into account, and still to reduce the amount of maintained information that is to be considered in the generating/updating process, it may be advantageous to maintain information with positions covered by the model at least randomly. The pre-defined probability criterion may for instance be a pre-defined probability value, e.g. 0.99. Randomly maintaining may then for instance be achieved by generating a random number between 0 and 1 and maintaining the information if the generated random number is larger than the pre-defined probability, for instance 0.99. The pre-defined probability criterion may also be based on further parameters the values of which are variable. For instance, the probability criterion may prescribe that the probability of discarding information shall be inversely proportional to a distance from the centre of a model for the coverage area of the communication node (so that with increasing distance, the probability of discarding information decreases), or proportional to the rate at which information is received (so that with increasing amount of information, the probability of discarding the information increases), to name but a few examples.

The model may for instance be a rectangular model. The model may for instance define a rectangle fitted around an ellipse defined by an elliptical model, wherein the elliptical model may be a representation of a model for the coverage area of the communication node that is to be provided to one or more terminals for positioning purposes. Information with positions outside the rectangle may then always maintained, whereas information with positions inside the rectangle is randomly rejected, which allows at least randomly maintaining information with positions in the area between the ellipse and the rectangle with a reasonable computational complexity. As positions outside the rectangle, also positions lying in this area between the ellipse and the rectangle indicate that the coverage area has changed (e.g. grown) and are thus significant for the generating/updating process.

A state of the state machine associated with the third exemplary determination rule may be a state in which the at least one model for the coverage area of the communication node produced by the process is considered to be complete (or at least substantially complete) (e.g. a stable state).

This consideration may for instance be based on the finding that a model for the coverage area has not changed for a pre-defined period of time.

A fourth exemplary determination rule of the one or more determination rules may require that all information shall be discarded. This determination rule may for instance be associated with a state of the state machine in which it is assumed that the model for the coverage area of the communication node is complete and that the coverage area will not change in the future. The determining whether information shall be discarded or made available to the generating/updating process may then be considered to be represented by determining if the fourth-type determination rule shall be applied or not.

A fifth exemplary determination rule of the one or more determination rules may require that information is discarded randomly according to a pre-defined probability criterion (for instance a pre-defined probability value). For instance, in case of a high probability of discarding information, this determination rule may for instance be associated with a state in which it is assumed that the model for the coverage area of the communication node is complete, but in which at least some information is not discarded to be able to monitor if changes in the coverage area occur.

It is to be noted that the above description of embodiments of the present invention is to be understood to be merely exemplary and non-limiting. Furthermore, the exemplary embodiments described above and in particular their single features shall be understood to be disclosed in all possible combinations with each other.

These and further concepts of the invention will be apparent from and elucidated with reference to the detailed description presented hereinafter.

DETAILED DESCRIPTION OF EXEMPLARY EMBODIMENTS OF THE INVENTION

Figure 1:
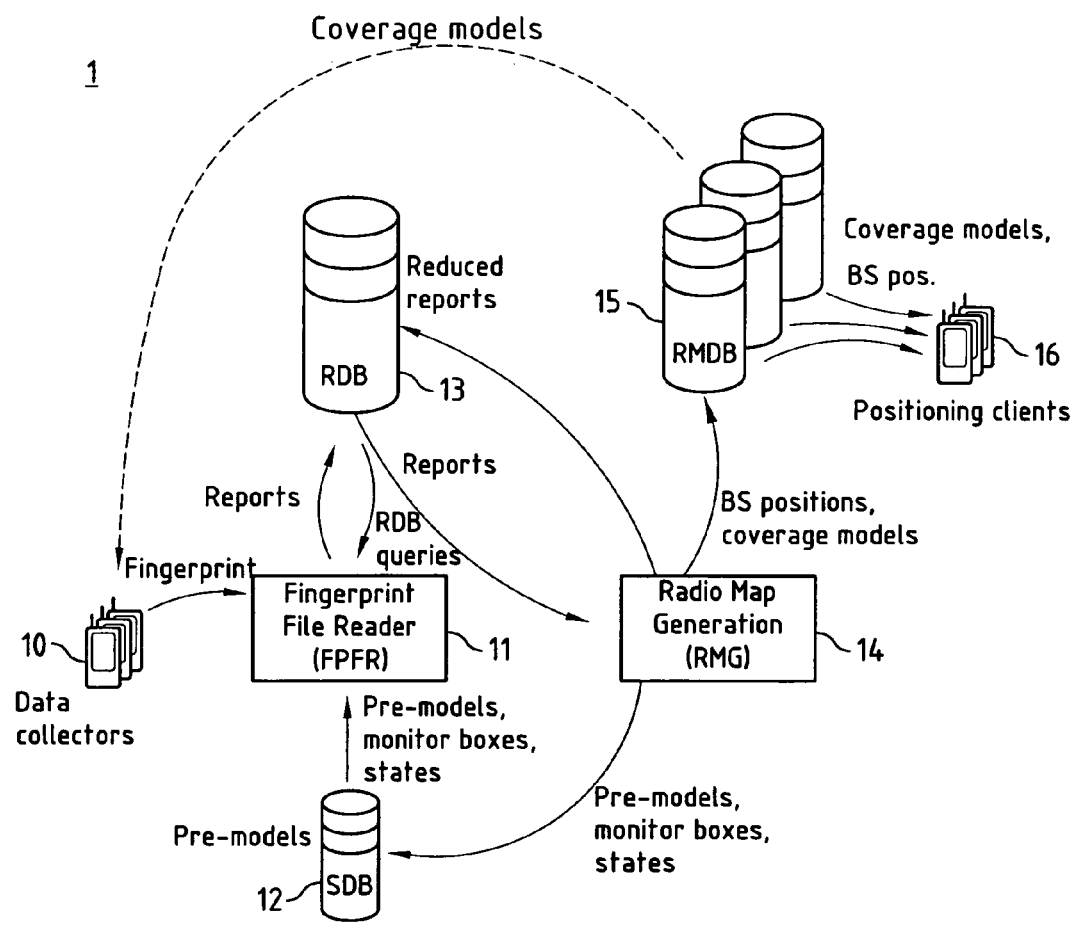
FIG. 1: A schematic block diagram of an exemplary system that implements exemplary concepts of the present invention.

Satellite positioning does not work well indoors or in other shadowed environments. However, various communication nodes are ubiquitous in the modern world. Non-limiting examples of such communication nodes include cellular base stations, WLAN access points, FM radio or TV stations. Instead of the term "communication node", also the term "base station" will be used in the following description, wherein the term "base station" is not necessarily understood to be restricted to a cellular base station. These base stations have good penetration and coverage virtually everywhere of interest. Since the range of these beacons may usually be relatively short (for instance hundreds of meters to some kilometers), these beacons may be exploited for positioning purposes.

For instance, WLAN-based positioning may complement Global Navigation Satellite System (GNSS) based positioning in urban environments. Typically GNSS-based positioning methods have problems in urban canyons—however, these are also areas, in which the WLAN AP density is high. WLAN-positioning also enables indoor positioning allowing for more effective Location Based Services (LBS).

WLAN Access Points (WLAN APs) can be used for positioning given that the position(s) of the AP(s) are known. In general, WLAN-based positioning assumes a database, either local (in the terminal) or remote (in the server) or a combination of those containing at least WLAN AP identification information (e.g. a WLAN AP Medium Access Control (MAC) address) and the geographical coordinates of the WLAN APs. The database may also contain an estimate of the WLAN AP position accuracy. Moreover, a coverage area may also be modeled.

The database of WLAN APs and their geographical coordinates and/or coverage models allow for positioning the terminal with WLAN. GNSS or some other conventional positioning capability may then not be required.

In positioning, the terminal performs a WLAN AP scan and then compares the scan results to the records in the database. If applicable records are found, the information is combined in some suitable manner (such as, weighted average based on Relative Signal Strength (RSS) values) to produce a position estimate for the terminal.

Therein, if the base station positions are known and distances from the terminal to the base stations can be estimated, the terminal's position can be estimated through triangulation. The distance between a terminal and the heard base stations can be estimated based on either the path loss (i.e. how much the signal attenuates between the terminal and the base station) using a channel model or based on timing (or round-trip timing) measurements (i.e. information expressing how long signals propagate between terminal and base station).

If models for the base station coverage areas are known, then a terminal may pick the coverage areas for the heard base stations and find the intersection of these coverage areas. The terminal can then be assigned a position that is, for instance, the center-of-mass of the intersection area. Moreover, a position error estimate may be given based on the size of the intersection.

These mechanisms may also be combined: distance measurements can be combined with coverage area models to produce a position estimate. Even satellite (GNSS) pseudorange measurements may be taken into account in these hybrid methods to obtain additional measurements.

The database for WLAN-based positioning can be built in various ways. One solution may be that a company buys hotspot directories from WLAN network providers and assimilates these directories in their databases. Alternatively, a plurality of terminals may perform the WLAN AP mapping. In such a case the terminals may have a Global Navigation Satellite System (GNSS) or Assisted GNSS (AGNSS) receiver attached to or inside the terminal and provide data on the WLAN AP's coverage. It may also be the case that the database build-up is a community-based effort.

It is readily understood by a person skilled in the art that the techniques described above in the context of a WLAN system are equally applicable with any other radio network-technology as well. Potential candidates include Bluetooth, Wibree (Ultra Low Power Bluetooth), Global System for Mobile Communication (GSM), Wideband Code Division Multiple Access (WCDMA), Code Division Multiple Access (CDMA), Long Term Evolution (LTE), Worldwide Interoperability for Microwave Access (WiMAX), to name but a few non-limiting examples.

The above-described WLAN-based positioning may also be combined/complemented with Cell ID-based positioning. When collecting the data for the WLAN AP database, also information on 2G (second generation, e.g. GSM) and/or 3G (third generation, e.g. UMTS) cells (or on cells of any other cellular communication system) that can be observed in the present position (serving station and optionally also the neighboring stations) may be collected.

The data collected on WLAN APs and 2G/3G cells can for instance be collected on central servers and distributed to the terminals for position determination.

FIG. 1 schematically illustrates the functional blocks of an exemplary system 1 that implements aspects of the present invention.

The server side of the exemplary system 1 comprises two processing blocks, Finger Print (FP) File Reader (FPFR) block 11 and Radio Map Generation (RMG) block 14. Moreover, there are three data stores, Report Data Base (RDB) 13, Screening Data Base (SDB) 12 and Radio Map Data Base (RMDB) 15. Each can be either centralized or, for example, regionally distributed. Moreover, although the exemplary architecture shows several different databases, they can be implemented as one single same database or may be broken down in more databases in different implementations. It is clear to a person skilled in the art that the actual number and naming of databases is an implementation issue and does not affect the concept disclosed in this specification. The terminals 10 acting as data collectors or positioning clients 16 can also be seen as processing blocks of system 1.

The one or more terminals (e.g. mobile terminals) 10 with positioning capacity (e.g. GPS) send a fingerprint comprising one or more positions (i.e. terminal positions, for instance the terminal's coordinates) and a list of one or more base station IDs heard at each position, and optionally further parameters such as for instance their signal strengths and/or approximate ranges.

The fingerprint arrives to the FPFR block 11, which splits the information into base-station-specific reports, and stores the base-station-specific reports, which, in the simplest case, are only terminal positions, into the RDB 13. According to exemplary embodiments of the present invention, which will be described in more detail below, FPFR block 11 implements a filter that drops (discards) reports, for instance when they are considered to add no new information to the already collected data. In particular, to be able to deal with the massive number of incoming reports, the FPFR block 11 may for instance make use of simplified pre-models of the coverage area (stored in SDB 12) to be able to quickly drop a large number of redundant reports.

The RMG block 14 reads (for instance continuously or periodically, or in response to a trigger event, such as an arrival of a new report or an accumulation of a certain amount of reports) reports from the RDB 13, and updates the coverage models (for instance elliptical models or models that are based on elliptical models) to be distributed and delivered to the positioning clients 16, and the simplified pre-models to be fed back to the FPFR block 11 performing report screening (via SDB 12). The RMG block 14 may also remove redundant reports from RDB 13, keeping only a small but representative set of reports on the coverage area of each base station.

Finally, the coverage models are delivered to terminals 16 to be used for positioning on their own or combined to other positioning data in the terminal.

The following two ellipse formats are exemplarily used in this specification:

An "axis/angle-form" ellipse, defined by coordinates of the centre (in World Geodetic System WGS-84) longitude and latitude, lengths of the semi-major and semi-minor axes (in meters, referring to WGS-84 coordinates), and orientation of the semi-major axis (degrees, clock-wise from North). Moreover, a confidence value can be included as well. If the ellipse is interpreted in a statistical sense, i.e. to represent a soft statistical boundary for the positions in the coverage area rather than a hard boundary that includes all positions in the coverage area, the confidence value may specify which area with respect to the coverage area the ellipse describes. For instance, if the positions are assumed to be statistically distributed in the coverage area according to a 2D Gaussian distribution, the confidence value may for instance express if the ellipse represents the $\sigma$, $2\sigma$ or $3\sigma$ area of the 2D Gaussian distribution, wherein a is the standard deviation. Therein, the $\sigma$, $2\sigma$ and $3\sigma$ areas may for instance be understood as the areas in which about 39%, 86% and 99% of the terminal positions are considered to be within, respectively.

A "matrix-form" ellipse: coordinates (WGS-84) of the centre $c=(lat_E, lon_E)$, and three coefficients $a>0$, $d>0$, and $b$ so that point $x=(lat, lon)$ is inside the ellipse if $$(x-c)^T A (x-c) \leq 1$$

with $$A = \begin{bmatrix} a & b \\ b & d \end{bmatrix}.$$

The matrix-form ellipse may require more memory space for storage, but may be faster to manipulate than the axis/angle-form ellipse. Similar to the axis/angle-form ellipse, also the matrix-form ellipse may represent a soft statistical boundary for the positions in the coverage area rather than a hard boundary that includes all positions in the coverage area. For instance, the centre c may then be interpreted as the mean value and the matrix A may then be interpreted as the covariance matrix, for instance of a 2D Gaussian distribution assumed for the distribution of the positions in the coverage area. The ellipse may then no longer coincide with the outer boundary of the coverage area, it may rather define a sub-area or super-area of the coverage area, for instance the σ area.

Details on conversion between the two axis/angle-form ellipse and the matrix-form ellipse are given in Appendix A.4.

In the following, the processing blocks of the exemplary system 1 of FIG. 1 will be described in further detail.

The one or more terminals 10 send fingerprints. Fingerprints may for instance include available network measurements for 2G (e.g. GSM) and/or 3G (e.g. UMTS) serving and neighboring base stations as well as for WLAN base stations (access points). The network measurements for instance comprise the base station identification of the base stations heard, but may also include signal strength (Received Signal Strength, RSS) and timing measurements (such as Timing Advance, TA and/or Round Trip Delay), which may be indicative of the range to the base station. The majority of the fingerprints contain one or more estimates of the terminal's position. The fingerprints may further contain one or more timestamps.

From these fingerprints, base-station specific reports are generated by FPFR block 11, for instance in the form of Table 1, for storage in RDB 13. Therein, it is to be noted that the base station does not necessarily have to be the primary record for storing fingerprints/reports. Equally well, the fingerprints may be stored in a database in a position-specific way, so that the according entries in the database then may pertain to several base stations. The fingerprints may of course also be stored and/or processed according to other criteria.

TABLE 1

Exemplary Report Format

| Parameter | Description |
|---|---|
| ID | Unique ID code of the base station |
| Type | 2G/3G active/neighbour, WLAN, WiMAX, etc. |
| Timestamp | Timestamp |
| Position | Reported position |
| RSS | Received signal strength (if available) |
| Range | Range to base station (if available) |

As described above, in the exemplary system of FIG. 1, fingerprints containing measurements with respect to several base stations (and optionally neighboring base stations) are split by base station and treated separately.

RDB 13 may for instance store a pre-defined number of reports with respect to each base station, and it may be targeted to use as little computation as possible to sieve the significant ones from the mass of incoming reports.

RMG block 14 exemplarily uses a convex polygon (for instance a convex hull) to represent the terminal positions that are reported by the one or more terminals 10 (see FIG. 1), pass the FPFR block 11 and are at least temporarily stored (in the form of reports) in RDB 13. That is, instead of storing all terminal positions received from FPFR block 11 in RDB 13, only the terminal positions that form the vertices of a convex polygon (e.g. a convex hull) that encloses all these terminal positions are stored. Therein, the maximum number of vertices of this convex hull may be limited to some pre-defined value. If the number of vertices of the convex hull exceeds this maximum number, vertices of the convex hull may be merged to form a convex polygon (with increased area as compared to the convex hull) in a way that still all terminal positions are within the polygon.

This is accomplished by RMG block 14 by overwriting the reports in the RDB 13 with a reduced set of reports (or just deleting unnecessary ones), i.e. those reports that are associated with the terminal positions that form the polygon (i.e. its vertices). Nevertheless, depending on the monitoring status of the border terminal positions/reports (i.e. the vertices of the polygon), also interior terminal positions/reports (i.e. terminal positions/reports within the polygon) may be stored in RDB 13.

Figure 2:
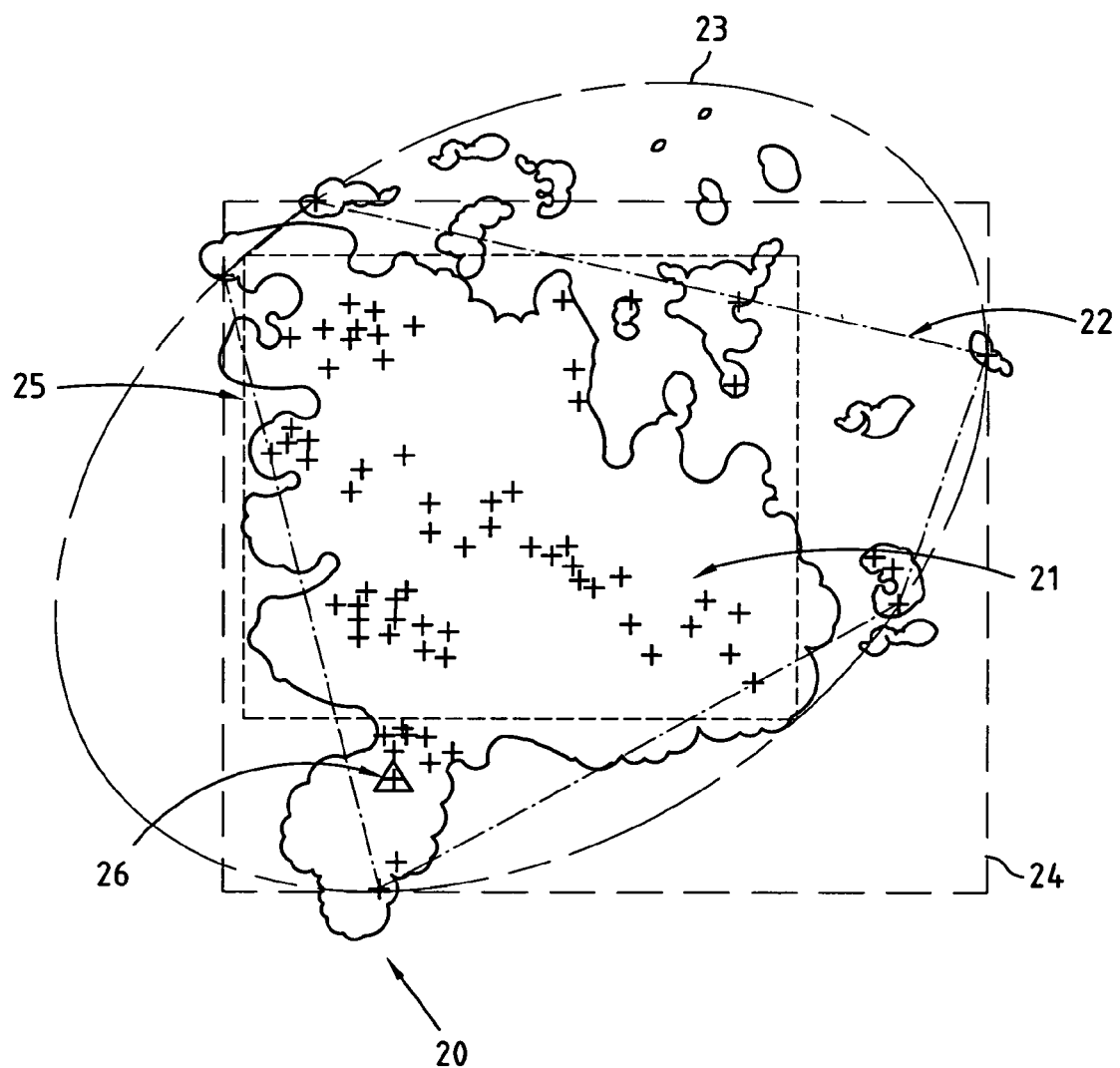
FIG. 2: a schematic illustration of an exemplary coverage area of a base station with exemplary models for this coverage area.

An example of a convex polygon 22 (in this case a convex hull) enclosing the terminal positions 21 in a coverage area 20 of a base station 26 is given in FIG. 2.

In addition to the polygon 22 serving as a model for the coverage area of the base station as discussed above, the RMG block 14 further generates a coverage model and different pre-models based on this polygon 22, as will be described now.

All of these models are models for the coverage area of the base station. In the following, models for the coverage area of the base station that are to be provided to the positioning terminals 16 (see FIG. 1) will be denoted as "coverage models" (e.g. the axis/angle-form ellipse (either representing a hard boundary or a soft statistical boundary) or a model that is based on the parameters of the axis/angle-form ellipse and for instance adds one or more further parameters, also either representing a hard boundary or a soft statistical boundary), whereas the models for the coverage area of the base station that are provided to FPFR 11 and stored in SDB 12 will be denoted as "pre-models" (e.g. the inner box, outer box and matrix-form ellipse models (which may also represent a hard boundary or a soft statistical boundary)).

In the following, for simplicity of presentation, it will exemplarily be assumed that the coverage models and pre-models represent hard boundaries for the positions in the coverage area.

An elliptical coverage model is generated by RMG block 14 by fitting the minimum enclosing ellipse around the polygon 22 (see for instance ellipse 23 enclosing convex hull 22 in FIG. 2). When updating this ellipse, the old ellipse may be used as the initial guess. The ellipse or a model that is based on the ellipse may then be saved in RMDB 15 (as coverage model).

Figure 3:
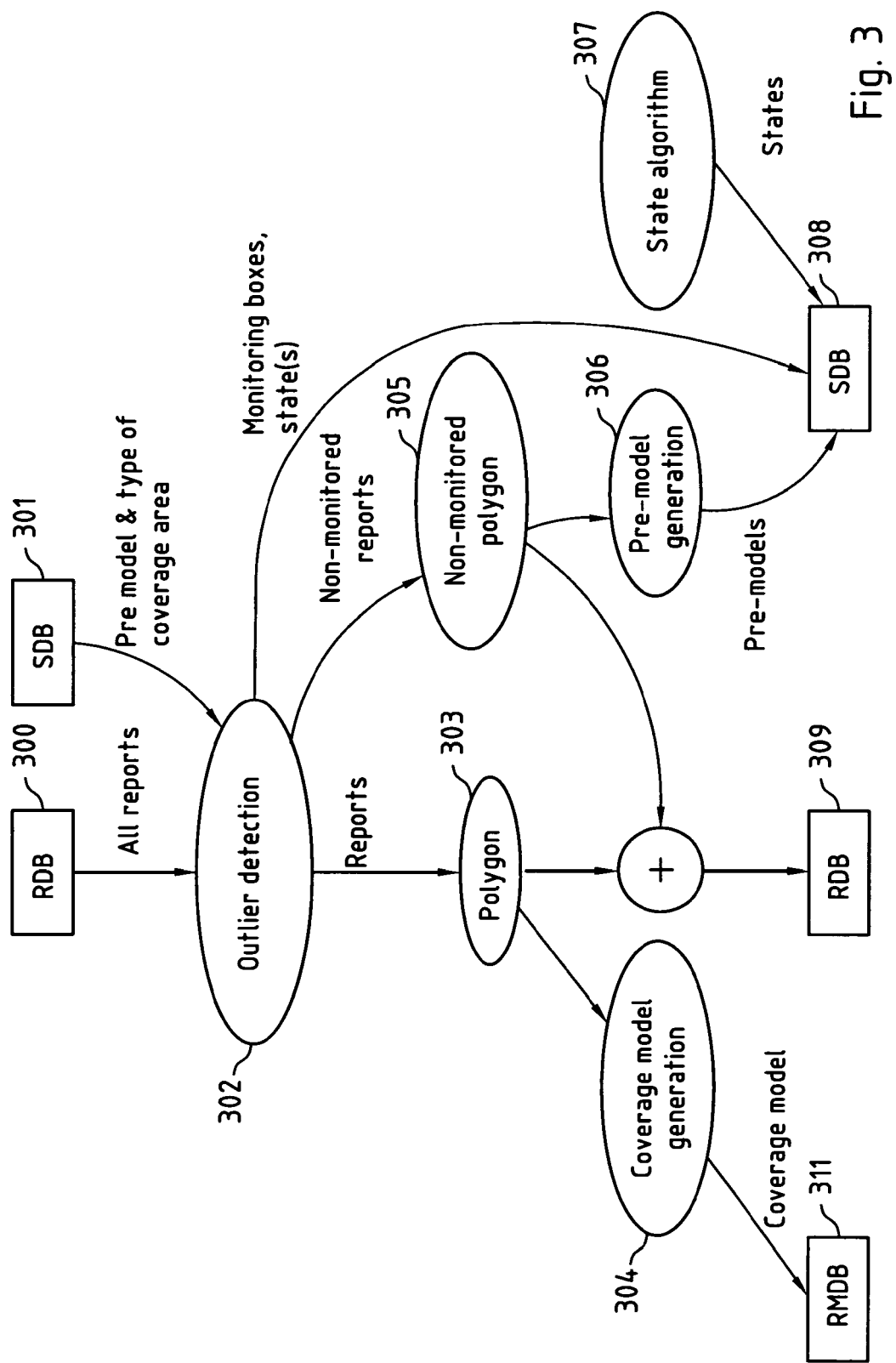
FIG. 3: a schematic block diagram of an exemplary embodiment of a process for generating and/or updating models for the coverage area of a base station according to the present invention.

FIG. 3 is a schematic illustration of the generation of a polygon serving as a representation (i.e. a model) of the coverage area of a base station and the coverage model and pre-models derived from this polygon.

Therein, block 302 performs outlier detection. Outlier detection is based on pre-models and/or information on the type of coverage area to be determined, for instance the maximum possible radius of the coverage area, as stored in SDB 301 (corresponding to SDB 12 of FIG. 1). The concepts of outlier detection and monitoring will be explained in further detail below.

For all reports contained in RDB 300 (corresponding to RDB 13 of FIG. 1), a polygonal representation is determined in block 303. This polygon is then input into block 304, where a coverage model (e.g. an ellipse or a model derived from it) is generated from the polygon, and this coverage model is then stored in RMDB 311 (corresponding to RMDB 15 of FIG. 1).

For all currently non-monitored reports (i.e. for those reports that are neither suspected to be outdated nor suspected to be outliers), a non-monitored polygon is determined in block 305, and this non-monitored polygon serves as a basis for pre-model generation in block 306. The pre-models output by this block (e.g. an ellipse in matrix-form, the inner box and outer box, see FIG. 2) are then stored in SDB 308 (corresponding to SDB 12 in FIG. 1). SDB 308 further stores monitoring boxes (explained in more detail below), which may be required in FPFR 11 block, and state information (e.g. a current state of the state machine) (explained in more detail below), from block 302. SDB 308 further receives state information from state algorithm block 307.

Information on the polygon determined in block 303 and on the non-monitored polygon determined in block 305 is stored back to RDB 309 (corresponding to RDB 13 in FIG. 1).

Each of blocks 303, 304, 305 and 306 in FIG. 3, or some or all of these blocks taken together, may be considered to represent a generating/updating process that generates and/or updates at least one model for the coverage area of a base station. The functionality of all blocks 303, 304, 305 and 306 taken together is referred to as RMG process in this specification.

Table 2 illustrates an exemplary coverage model entry in RMDB 15.

TABLE 2

Exemplary coverage model entry in the RMDB

| Parameter | Description |
| --- | --- |
| ID | Unique ID code of the base station |
| Type | 2G, 3G, WLAN, etc. |
| State | State from SDB |
| Position | Base station position (if available) |
| Coverage model | Coverage model, e.g. a model comprising the parameters of the axis/angle-form ellipse and optionally further parameters |

As already mentioned, RMG block 14 further generates pre-models, which are stored in SDB 12. In the following, use of the following exemplary pre-models will be assumed (see FIG. 2):

matrix-form ellipse 23: Minimal matrix-form ellipse fitted around the polygon 22. All reports so far are inside this ellipse 23.

outer box 24: Formed from minimum and maximum coordinates. All reports so far are inside the outer box 24.

inner box 25: Maximal box fitted inside the outer ellipse 23 (see Appendix A.3). Reports inside the inner box 25 do not change the current ellipse.

Table 3 illustrates an exemplary entry in SDB 12.

TABLE 3

Exemplary SDB entry

| Parameter | Description |
| --- | --- |
| ID | Unique ID code of the base station |
| timestamp | time when pre-models were last modified |

TABLE 3-continued

Exemplary SDB entry

| Parameter | Description |
| --- | --- |
| Type | 2G, 3G, WLAN, etc. |
| State | State of the state machine for the access point |
| monitorBox | Monitoring boxes |
| monitorExp | Monitoring expiry timestamps |
| InnerBox | Pre-model (min/max lat/lon) |
| OuterBox | Pre-model (min/max lat/lon) |
| Ellipse | Pre-model (matrix-form) |

According to exemplary embodiments of the present invention, in FPFR block 11, a screening of incoming fingerprints/reports is performed to determine if these incoming fingerprints/reports shall be discarded or made available to the RMG process that generates and/or updates the models for the coverage area of a base station (such as for instance the polygonal representation of the terminal positions/reports, the coverage model (e.g. a model comprising the parameters of the axis/angle-form ellipse and optionally further parameters) and the pre-models (e.g. the inner and outer box models and the matrix-form ellipse)). Only fingerprints/reports that are determined to be not discarded are made available to the RMG process by storing it in RDB 13.

Figure 4:
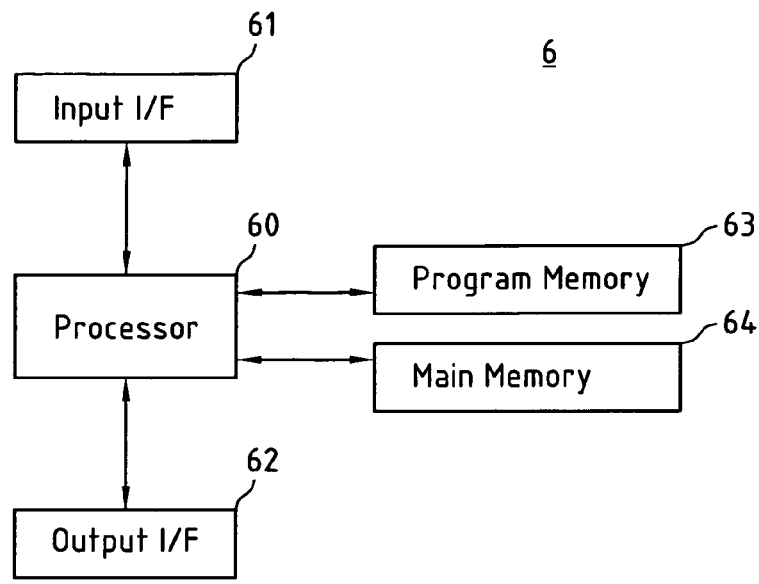
FIG. 4: a schematic block diagram of an exemplary embodiment of an apparatus according to the present invention.

FIG. 4 is a schematic illustration of an exemplary embodiment of an apparatus 6 according to the present invention. The apparatus 6 comprises a processor 60, which communicates with input interface 61, output interface 62, program memory 63 and main memory 65.

Processor 60 is configured to implement at least functionality to determine, whether information useable for a generating/updating process that comprises generating and/or updating at least one model for a coverage area of a base station shall be discarded or made available to the generating/updating process. To this end, processor 60 may for instance run a computer program with program code for determining whether information useable for a generating/updating process that comprises generating and/or updating at least one model for a coverage area of a base station shall be discarded or made available to the generating/updating process. This computer program may for instance be stored in program memory 63, which may be fixedly attached in apparatus 6 or may be a removable memory. Main memory 64 is used by processor 60 as a working memory, for instance to store intermediate results and variables.

Processor 60 thus at least partially implements functionality of FPFR block 11 of FIG. 1.

Input interface 61 is configured to allow obtaining information from another unit. This information comprises information useable for a generating/updating process, such as fingerprints and/or reports from the data collectors 10 of system 1 (see FIG. 1) or from a unit that receives the fingerprints or reports from the data collectors 10. The information may further comprise information from SDB 12, such as for instance pre-models, monitor boxes, states and/or determination rules. The information may further comprise RDB queries received from RDB 13.

Similarly, output interface 62 is configured to allow outputting of data to another unit, in particular information that is determined to be maintained and thus to be made available for the generating/updating process. An example of such information are reports that are considered to be maintained and are stored in RDB 13 to be considered by RMG block 14 in the generating/updating process in which the polygon, the coverage model and the pre-models are generated and/or updated.

As indicated above, processor 60 may be further configured to implement further functions of FPFR block 11 of the system of FIG. 1, for instance splitting fingerprints into base-station-specific reports, deriving terminal positions from coverage models send by the data collectors 10, checking if reports/terminal positions fall into monitor boxes (as will be explained in more detail below), triggering state transitions of the state machine, and performing RDB queries, to name but a few examples.

Processor 60 may also be further configured to implement some or all of the functionality of RMG block 14 (see FIG. 1) of the exemplary system of FIG. 1, as exemplarily illustrated in FIG. 3. This may for instance comprise some or all of the following functions: generating one or more polygons to represent a plurality of reports (and the coverage area), deriving coverage models and/or pre-models form the one or more polygons, detecting potential outliers (as will be explained in more detail below), at least partially (or also entirely) operating a state machine that has different states (as will be explained in more detail below), at least partially (or also entirely) controlling the state transitions in the state machine, and performing base station position estimation, to name but a few examples.

Accordingly, depending on the functionalities implemented by processor 60, input interface 61 then may further be configured to receive reports from RDB 13, and output interface 62 then may be further configured to output at least one of the following: reduced reports/terminal positions to RDB 13, coverage models (and optionally estimated base station positions) to RMDB 15, and pre-models, states and monitor boxes to SDB 12.

Apparatus 6 may for instance be entirely implemented as a module that may for instance be integrated into a server. Apparatus 6 may for instance be entirely implemented as a circuit on a semiconductor chip. Apparatus 6 may for instance be entirely implemented on a Digital Signal Processor (DSP), Application Specific Integrated Circuit (ASIC) or Field Programmable Gate Array (FPGA), to name but a few examples.

Figure 5:
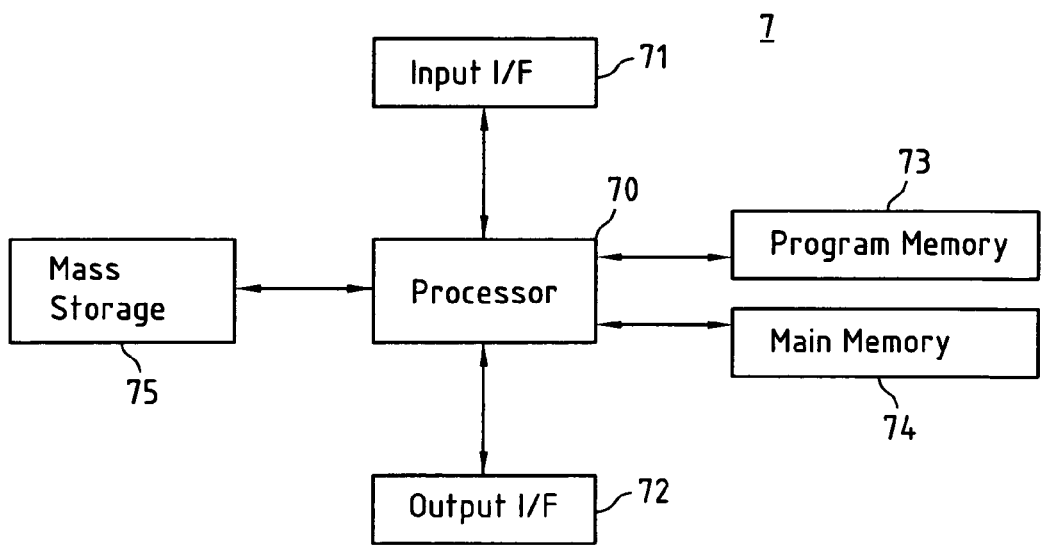
FIG. 5: a schematic block diagram of a further exemplary embodiment of an apparatus according to the present invention.

FIG. 5 is a schematic illustration of a further exemplary embodiment of an apparatus 7 according to the present invention. The apparatus 7 comprises a processor 70, which communicates with input interface 71, output interface 72, program memory 73, main memory 74 and a mass storage 75.

Processor 70 is configured to implement at least functionality to determine whether information useable for a generating/updating process that comprises generating and/or updating at least one model for a coverage area of a base station shall be discarded or made available to the generating/updating process. To this end, processor 70 may for instance run a computer program with program code for determining whether information useable for a generating/updating process that comprises generating and/or updating at least one model for a coverage area of a base station shall be discarded or made available to the generating/updating process. This computer program may for instance be stored in program memory 73, which may be fixedly attached in apparatus 7 or may be a removable memory. Main memory 74 is used by processor 70 as a working memory, for instance to store intermediate results and variables.

Processor 70 thus at least partially implements functionality of FPFR block 11 of FIG. 1.

Processor 70 may be further configured to implement further functions of FPFR block 11 of the exemplary system of FIG. 1, for instance splitting fingerprints into base-station-specific reports, deriving terminal positions from coverage models sent by the data collectors 10, checking if reports/terminal positions fall into monitor boxes (as will be explained in more detail below), and responding to RDB queries, to name but a few examples.

Processor 70 may also be further configured to implement some or all of the functionality of RMG block 14 (see FIG. 1) of system 1 of FIG. 1, as exemplarily illustrated in FIG. 3. This may for instance comprise some or all of the following functions: generating one or more polygons to represent a plurality of reports (and the coverage area), deriving coverage models and/or pre-models form the one or more polygons, detecting potential outliers (as will be explained in more detail below), triggering state transitions of a state machine at least partially (or also entirely) operating a state machine with different states, at least partially controlling the state transitions in the state machine, and performing base station position estimation, to name but a few examples.

Mass storage 75 may for instance be configured to implement one or more of RDB 13, SDB 12 and RMDB 15 (either as separate data bases or as a common single data base). Depending on the amount of functionality implemented by processor 70 and on the number and choice of databases (RDB, SDB, RMDB) implemented by mass storage 75, it is then readily clear for a person skilled in the art for the transfer of which kind of information input interface 71, output interface 72 and the connection between processor 70 and mass storage 75 have to be configured.

For instance, if processor 70 implements the functionality of FPFR block 11 and RMG block 14 of the exemplary system of FIG. 1, the connection between processor 70 and mass storage 75 may have to be capable of transferring the following (see FIG. 1): (reduced) reports, RDB queries and responses, BS positions, coverage models, pre-models, monitor boxes and states. Furthermore, input interface 71 may then have to be configured to receive fingerprints from data collectors 10 (or from an instance that receives these fingerprints from data collectors 10), and output interface 72 may have to be configured to output coverage models and base station positions to the positioning clients 16, and coverage models to data collectors 10.

Apparatus 7 may for instance be entirely implemented as a module that may for instance be integrated into a server. Apparatus 7 may for instance be entirely implemented as a circuit on a semiconductor chip. Apparatus 7 may for instance be entirely implemented on a Digital Signal Processor (DSP), Application Specific Integrated Circuit (ASIC) or Field Programmable Gate Array (FPGA), to name but a few examples.

Figure 6:
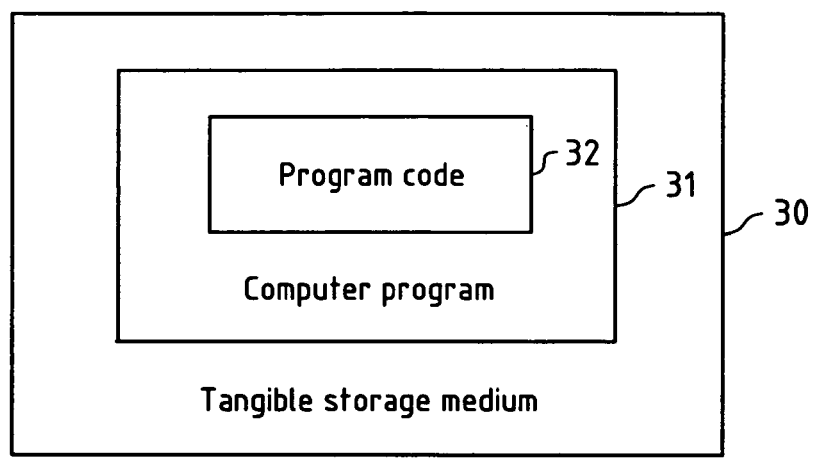
FIG. 6: a schematic illustration of an exemplary embodiment of a tangible storage medium according to the present invention.

FIG. 6 is schematic illustration of an exemplary embodiment of a tangible storage medium 30 according to the present invention. Tangible storage medium 30 may for instance store a computer program 31 with program code 32 for determining whether information useable for a generating/updating process that comprises generating and/or updating at least one model for a coverage area of a base station shall be discarded or made available to the generating/updating process. Tangible storage medium 30 is a readable medium, for instance a computer-readable or processor-readable medium. Accordingly, the computer program 31 stored on tangible storage medium 30 may be executable by a computer or a processor. Tangible storage medium 30 may for instance be embodied as an electric, magnetic, electro-magnetic, optic or other tangible storage medium, and may either be a removable medium or a medium that is fixedly installed in an apparatus or device, such as for instance apparatus 4 of FIG. 4 or apparatus 7 of FIG. 5.

Figure 7:
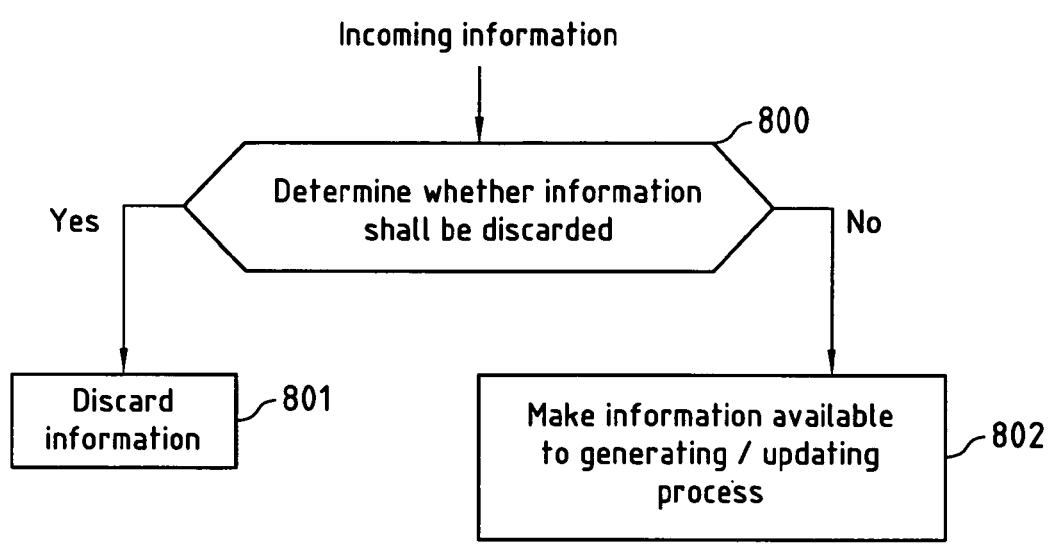
FIG. 7: a flowchart of an exemplary embodiment of a method according to the present invention.

FIG. 7 is a flowchart of an exemplary embodiment of a method according to the present invention. This flowchart may for instance be implemented as a computer program that is stored in program memory 63 of apparatus 6 (see FIG. 4) or in program memory 73 of apparatus 7 (see FIG. 5). Consequently, this flowchart may be executed by processor 60 of apparatus 6 or processor 70 of apparatus 7. Equally well, this flowchart may be implemented as program code 32 of computer program 31 stored on tangible storage medium 30 (see FIG. 6).

In case of incoming information, step 800 is executed by determining whether the incoming information shall be discarded. Discarded information may be considered as information that is not interesting/significant for the generating/updating process. In the context of the exemplary system of FIG. 1, this information may for instance be fingerprints or reports (for instance base-station-specific reports) derived from one or more fingerprints or from a coverage model.

This determining whether information shall be discarded may for instance be based on one or more models for the coverage area of a base station, for instance the exemplary pre-models inner box, outer box and matrix-form ellipse already introduced above. For instance, it may be checked whether a terminal position contained in the information is covered (or not covered) by such a pre-model (e.g. is within an area defined by the pre-model) or not to determine whether the information shall be discarded or not. The determining may also comprise first checking if a terminal position is not covered by a first-type model, and only if this is the case, checking if the terminal position is covered by a second-type model. The determining may also comprise randomly rejecting information that is found to be covered by a model. As an example, all positions covered by the inner box model may be discarded right away. As a further example, all positions not covered by the outer box model may be maintained. In a computationally more demanding case, the positions covered by the matrix-form ellipse are discarded.

The rationale for basing the determining in step 800 on one or more models for the coverage area of a base station, e.g. the pre-models inner box, outer box and/or matrix-form ellipse, may be to maintain only positions that are considered to change these pre-models and/or to change a model (e.g. the polygonal model and/or a model that comprises the parameters of the axis/angle-form ellipse and optionally further parameters) from which the pre-models are derived.

The determining in step 800 may for instance depend on an amount of (currently) available computation resources, so that, in case that many computation resources are available, less information is discarded, and in case that only few computation resources are available, more information is discarded. For instance, if computation power is available, all positions inside the inner box might be dropped right away, or in the extreme case of low computational power, all positions inside the outer box may be dropped right away, so that only extreme new positions may be considered further by the process.

The determining may be based on determination rules that define in which cases information shall be discarded and in which cases it shall be maintained. There may exist several different determination rules, and the determining may be controllable by prescribing which determination rule shall be currently used. The determination rule to be used may for instance be prescribed by the current state of a state machine, as will be explained with reference to the exemplary embodiment of FIG. 8 below.

If it is determined that the information shall be discarded, the information is discarded in step 801, for instance by performing no further action, or by actively deleting the information, to name but a few examples. If it is determined that the information shall be maintained, in a step 802, the information is made available to a generating/updating process (for instance the RMG process of RMG block 14). This may for instance be accomplished by storing the information in a memory where it can be retrieved by the process, or by directly forwarding the information to the process. In the context of the exemplary system of FIG. 1, the information (i.e. the fingerprints/reports) is for instance made available to the RMG process by storing it in RDB 13.

The screening/filtering represented by the determining whether information shall be discarded or made available to the generating/updating process contributes to reduce the amount of information that has to be processed by the generating/updating process. Therein, basing the determining on pre-models such as the inner box, outer box and matrix-form ellipse models allows this screening/filtering to be performed with comparably low computational complexity. Therein, with respect to the matrix-form ellipse, it is to be noted that, although this model may require more memory than the axis/angle-form ellipse, checking if a point is covered by the matrix-form ellipse model only requires 14 operations (see Appendix A.2), whereas the axis/angle-form ellipse requires 55 operations (see Appendix A.6). The rectangular models inner and outer box are efficient with respect to both storage requirements (only two corner coordinates need to be stored, and one of those can for instance be given relative to the other) and checking if a position is covered by the model (only 4 operations are required, as compared to the 14 operations required in case of the matrix-form ellipse and around 50-100 operations required in case of a polygonal model, see Appendix A.5).

According to exemplary embodiments of the present invention, the determining in step 800 of FIG. 7 is based on determination rules that are respectively associated with states of a state machine. Based on the states of the state machine, different determination rules are then applied to determine if information (e.g. information received from the data collecting terminals such as fingerprints and/or reports) shall be dropped or shall be used in the generating/updating process.

In the following, it is exemplarily assumed that the states of this state machine correspond to the states of at least one model produced by the generating/updating process (e.g. the RMG process), wherein these states of the at least one model may for instance relate to the generating/updating process (for instance to a progress thereof). In the following, due to their exemplary correspondence, no differentiation will be made between the states of the state machine and the states of the at least one model. The at least one model may be referred to as a state-machine associated model. Since the state-machine-associated model is specific for a coverage area of a base station, the state machine is also understood to be associated with the respective coverage area (and the respective base station).

Figure 8:
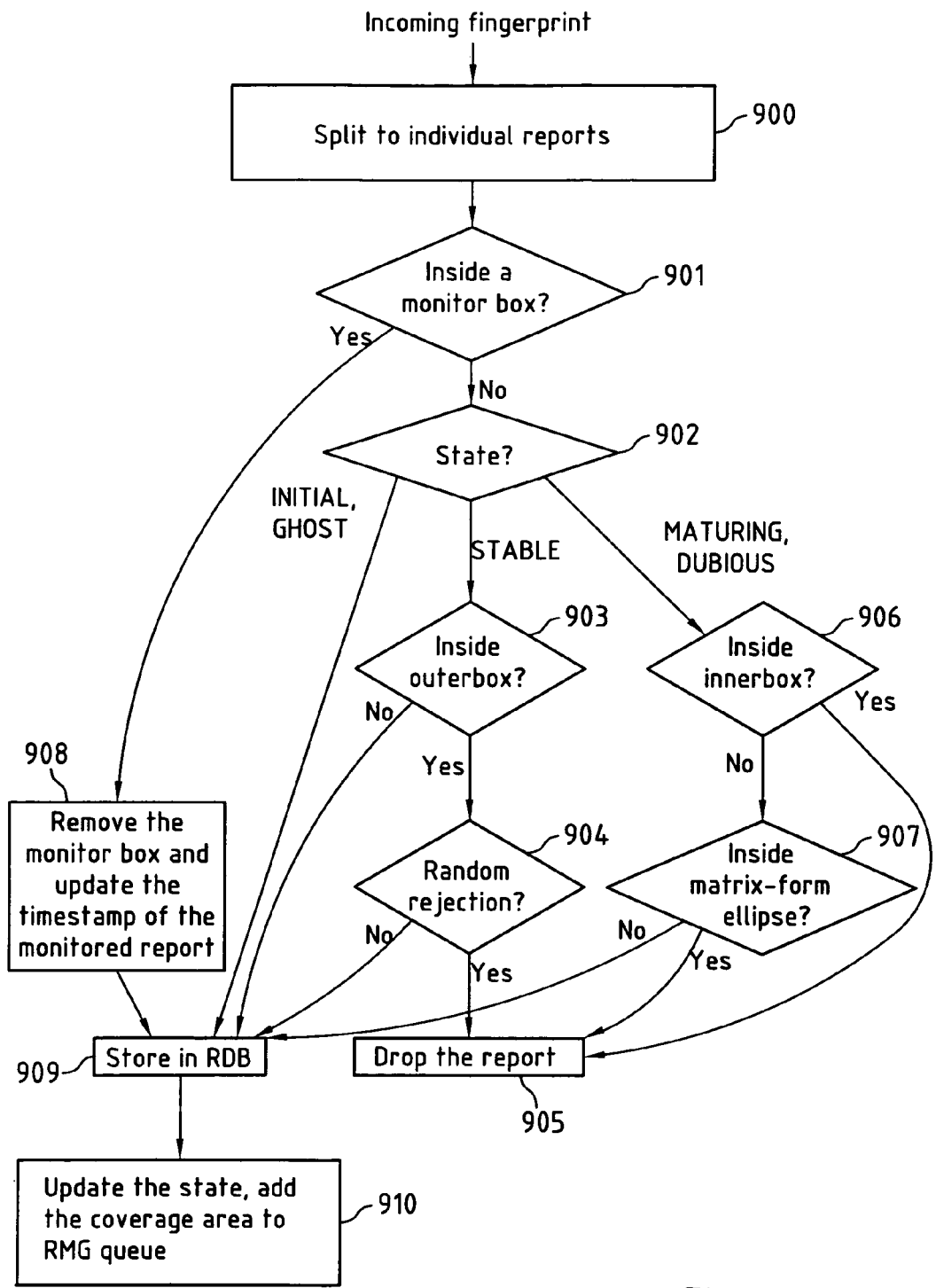
FIG. 8: a flowchart of an exemplary screening process according to the present invention.

The flowchart of FIG. 8 represents an according exemplary embodiment of the method according to the present invention. This flowchart may for instance be implemented as a computer program that is stored in program memory 63 of apparatus 6 (see FIG. 4) or in program memory 73 of apparatus 7 (see FIG. 5). Consequently, this flowchart may be executed by processor 60 of apparatus 6 or processor 70 of apparatus 7.

In step 900 of FIG. 8, fingerprints received from data collecting terminals 10 of system 1 (see FIG. 1) are first split into individual (base-station-specific) reports (or converted into individual reports in case of incoming coverage models).

If the report is within a monitor box (step 501), which will be explained in further detail below, the monitor box is removed (step 908), the timestamp of the monitored report is updated (step 908), and the report is stored in RDB 13 (step 909). It is seen that, in this exemplary example, the checking whether a position is within a monitor box is independent of the state. This may be one possible way to ensure that the state specific discarding of reports does not interfere with the monitoring process.

Otherwise, a processing according to the state of the state machine for the coverage area is executed (see step 902).

The exemplary states used in FIG. 8 are:
1. INITIAL: The determination rule here is to store all reports that are in the RDB 13 (see step 909). This state is used for new coverage areas and those coverage areas that gather very little traffic.
2. MATURING: The determination rule here is as follows: Drop reports inside the inner box 25 (see FIG. 2), which may be about 50%-90% of the incoming data (see steps 906 and 905) and, (if not low on computation power) drop also reports inside the pre-model (matrix-form) ellipse (see FIG. 2), see steps 907 and 905.

Therein, an exemplary algorithm for checking if a point is within a box is presented in Appendix A.1 and requires only 4 operations. Furthermore, an exemplary algorithm for checking if a point is within an ellipse is described in Appendix A.2 and requires 14 operations. It is thus readily seen that, by first checking if positions are within the inner box, a large amount of positions can be sorted out with low computational complexity, and only the positions that survive this check need to be checked against the ellipse. For points that are within the ellipse and outside the inner box, this actually adds an overhead of 4 operations as compared so a situation where the position would be directly checked against the ellipse. However, this overhead is by far compensated by the 14−4=10 operations that are saved for each position that is within the inner box and can then be discarded without checking against the ellipse.
3. STABLE: Used when the coverage area approximation is believed to be correct. The determination rule is as follows:

If a report is outside the outer box 24 (see FIG. 2), store it, see step 903; otherwise, drop the report with a random chance (see step 904), for instance with 99% or 99.9% (for instance by generating a random number between 0 and 1, and dropping the report if the number is smaller than 0.99 or 0.999).

This will quickly discard most of the incoming reports, but may still allow to eventually detect if the coverage area changes (based on the positions that are not randomly rejected).
4. DUBIOUS: More than one potential outlier has occurred, the true location of the coverage area or the coverage area itself is dubious. The same determination rule as in the MATURING state is performed.
5. GHOST: A coverage area whose reports have all expired and no new reports have been received since. The last known coverage model (e.g. an ellipse) is still kept in the RMDB 15. If any new reports with respect to the coverage area of this base station arrive, reinitialize it and put it to INITIAL state. The determination rule is then the same as in the INITIAL state.

In the flowchart of FIG. 8, there may be a further state DO NOT COLLECT, which causes a dropping of the report (step 905) without any further checks. This state may for instance be entered when the coverage model is considered to be complete and no further changes in the coverage area are expected.

In the exemplary flowchart of FIG. 8, steps 902, 903, 904, 906 and 907 may be considered to correspond to the determining step 800 of the flowchart of FIG. 7, and steps 905 and 909 in FIG. 8 correspond to steps 801 and 802 in FIG. 7, respectively.

In the flowchart of FIG. 8, storage of reports in RDB 13 (see step 909) triggers checking if the state of the coverage area has to be updated, and adding of the coverage area to the RMG queue, i.e. the reports are considered in the generating/updating process, see step 910. Thus any changes in a coverage area cause it to be put into the RMG queue.

The RMG process (for instance implemented by RMG block 14 of FIG. 1) is run for each coverage area found in the RMG queue for generation of a polygon, of coverage models and of pre-models as already described above, so these models are accordingly recalculated (updated). The RMG process thus may be identified as a generating/updating process. There may be precautions taken to ensure that a coverage area does not appear in the queue multiple times, as it could for instance happen with high-traffic coverage areas.

In the exemplary system of FIG. 1, in order to ensure that the coverage model and the pre-models are robustly adapted when the related coverage area changes, a monitoring process (MON) keeps running through the reports stored in RDB 13 and puts reports with too old timestamps into monitoring mode.

When a report is suspected to be outdated (or to be an outlier, as will be discussed in more detail below), it may then be put into monitoring mode. A monitor box may be spanned around it, and any new reports hitting the box (see step 901 of FIG. 8) may cause the monitor box to be removed and the corresponding report's timestamp updated to current time (see step 908 in FIG. 8).

Thus a timestamp (see Table 1) of a report is set/updated to the current time when the report arrives, or when it is in monitoring and its monitor box gets a hit. The timestamp associated with a report therefore indicates when was the last time that there was a report from (the vicinity) of that position.

When setting up the monitor box, it may be given an expiry timestamp some time in the future. If no reports fall inside the monitor box during this time, the report may be removed.

A report may thus be caused to go into monitoring mode by the monitoring (MON) process that keeps checking the timestamps of all reports and puts the old ones into monitoring.

As will be discussed in further detail below, reports may also go into monitoring mode if a report is considered to be a potential outlier. This checking may for instance be performed by an outlier detection process, which may constitute a part of the RMG process.

The width of the monitor box used if a report is in monitoring mode may for instance depend on the size of the coverage area, and the rate of incoming measurements. If a coverage area has any reports in monitoring, they are checked first (see for instance step 901 in FIG. 8) without any state-dependent filtering, so the state of the state machine does not affect monitoring.

The monitoring process (MON) keeps iterating—continuously, periodically or event-based—through all coverage areas in RDB 13. In particular, if any reports are older than a pre-defined duration of time and not already monitored, monitoring boxes are created for them (with an expiry time some time in the future), and the associated coverage area is put into the RMG queue.

Furthermore, if any monitor box is detected to be past its expiry time, it is removed together with its associated report, and the associated coverage area is put into the RMG queue. The monitoring process further triggers state transitions of the state diagram, as will be explained below.

As already indicated above, the concept of putting reports into monitoring mode by setting up monitoring boxes is not only used when reports are considered by the monitoring process (MON) to be potentially outdated, but also when an outlier detection process considers a report to represent a potential outlier.

The outlier detection process will now be described in further detail with respect to the exemplary system of FIG. 1. Therein, it is exemplarily assumed that the outlier detection process is a part of the RMG process.

The outlier detection process checks new reports (for instance new reports in the RDB 13) against the old coverage area estimates (for instance based on existing pre-models) and puts potential outliers (for instance reports with positions that have a distance with respect to the pre-models that is above a pre-defined threshold) directly into monitoring with a pre-defined expiry time, which may for instance be shorter than the expiry time used for reports suspected to be outdated by monitoring (see step 302 in FIG. 3).

It should be noted that there is no differentiation in the treatment of the report for which the monitoring box has been set up as to whether the monitoring box was set up by the monitoring process of the outlier detection process.

As already discussed above in the context of the monitoring process, when a report arrives, or when it is in monitoring and its monitor box gets a hit, its timestamp is updated to the current time. The timestamp therefore indicates when was the last time that there was a report from (the vicinity) of that position.

As already explained with reference to steps 303 and 304 of FIG. 3, when a coverage area has reports in monitoring mode, the RMG stores, in addition to the polygon of all reports, also the vertices of a polygon only from non-monitored reports. This way, in a case of potential outliers, the optimal polygons both including and excluding the potential outliers can be maintained. This arrangement may ensure that if some of the monitored vertices are removed, there are vertices in reserve (i.e. vertices in the vicinity of the monitored vertices that are not discarded in screening since the pre-models used in screening are based on the non-monitored polygon) to produce a good coverage model.

Single potential outliers are put in monitoring so that they disappear quickly unless they are verified by new reports.

In case of multiple potential outliers from different terminals or, if it cannot be distinguished between terminals, multiple potential outliers having different timestamps (wherein several positions reported from the same terminal and reported in a single upload/report batch are assigned the same timestamp), all the vertices of the polygon are put in monitoring and the coverage area is set to DUBIOUS state, so that either the old positions or the new positions are quickly verified and the obsolete ones expire away.

Figure 9:
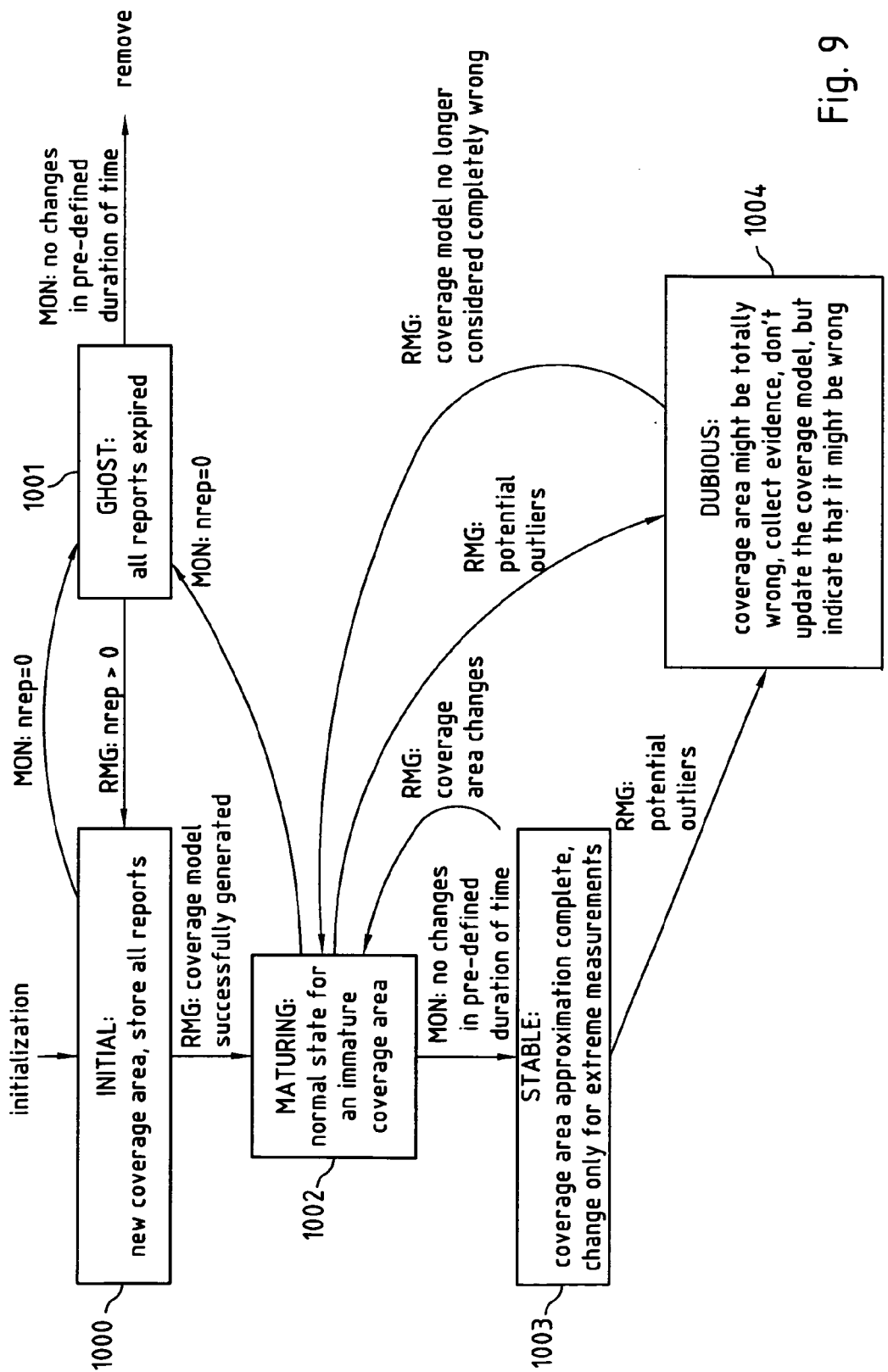
FIG. 9: an exemplary state transition diagram for an exemplary state machine according to the present invention.

FIG. 9 illustrates an exemplary state transition diagram for an exemplary state machine with exemplary states as introduced in FIG. 8 and also the events from the MON and RMG (including the outlier detection process) processes that partially trigger the state transitions. In the exemplary system of FIG. 1, the current state of the state machine for each coverage area is stored in SDB 12.

Initialization of the state transition diagram of FIG. 9 leads to the INITIAL state 1000, i.e. there is a coverage model for a new coverage area to be determined, and all incoming reports are stored. If the monitoring process reveals that there are no reports for the coverage area (for instance since all reports (if any) forming the polygonal representation had to be removed due to lack of hints of the monitor boxes), the state associated with this coverage area is changed to GHOST 1001, i.e. there are no reports or all reports expired. If the state is GHOST 1001, and the monitoring process turns out that no changes occur in a pre-defined duration of time, all information pertaining to this coverage area is removed. The cell is then considered to have vanished altogether.

If the state is INITIAL 1000, and RMG reports that an elliptical coverage model (exemplarily assumed here) has been generated (see step 404 of FIG. 4), the new state is MATURING 1002. If the monitoring process now turns out that there are no changes within a pre-defined duration of time, the state is changed to STABLE 1003, and it is only changed back to MATURING 1002 in case that the RMG process informs on changes in the coverage area.

Furthermore, if the state is STABLE 1003, and the RMG process (or the outlier detection process, if it is not part of the RMG process) informs that there are multiple potential outliers, the state is changed to DUBIOUS 1004. The same information causes also a transition from state MATURING 1002 to state DUBIOUS 1004.

In state DUBIOUS 1004, the coverage model is not updated (in RMDB 15) with the potential outliers, but it is indicated that the coverage model might be wrong (by updating the state in RMDB 15 to DUBIOUS, see Table 2). From the DUBIOUS state 1004, a transition to state MATURING 1002 is possible if the RMG process reports that the elliptical coverage model is no longer considered to be completely wrong. An exemplary indication of this might, for example, be that the size of the assumed coverage area is again within predefined limits.

In the following, principles of the exemplary fingerprint collection system of FIG. 1 will be described with reference to exemplary use cases. Therein, exemplary goals are inter alia to postpone as much computation as possible from FPFR block 11 to the RMG block 13, to change the RMDB 15 as rarely as possible, and to be conservative about the coverage area estimates so that rather a too large estimate is given than a too small one.

New Coverage Area

The first fingerprint/report from a new coverage area causes RMG block 13 to create a new entry in SDB 12 for that coverage area. The coverage area starts in INITIAL state 1000 (see FIG. 9) in which no reports are discarded (see FIG. 8). Each incoming report causes the RMG to be run.

Once a coverage model (e.g. an ellipse) has been successfully generated, RMG puts the state to MATURING 1002 (see FIG. 9) and screening with pre-models begins (see FIG. 8). After the coverage area approximation has stopped growing, it eventually goes into STABLE state 1003 (see FIG. 9).

Normal Operation

This is when the coverage area approximation is correct and the system operates normally (should be about 99.9% of the time).

The state of the state machine for the coverage area is STABLE 1003 (see FIG. 9). Because most of the incoming reports are thrown away in screening (save for the, for instance, 1% or 0.1% that pass through the random rejection, see step 904 of FIG. 8), the vertices will go into monitoring mode now and then, but as the model is about correct and there is traffic in the coverage area, some report will hit the monitor box and the vertex's timestamp is updated. The coverage model (e.g. an ellipse) stays untouched in this case.

Occasionally some terminal's GPS may be a bit off and it reports a point, say, 500 m outside the coverage area approximation. This report is outside the outerbox (see step 903 in FIG. 8) and thus passes to RMG. It is tagged as a potential outlier there and put on a short monitoring period. The coverage model (e.g. an ellipse) will temporarily expand to include also this point (see steps 303, 304 in FIG. 3), and the state drops into the MATURING state 1002 (see FIG. 9), but the coverage model will snap back to its former form after the outlying report expires, and back to STABLE state 1003 (see FIG. 9) after sufficient time passes without new potential outliers.

Disappearing Coverage Area

If a coverage area suddenly ceases to be (for instance due to base station removal or turn-off, to name but a few possibilities), there will not be any more reports featuring it, and all of its reports will expire in time. When the last report is removed, MON sets the state to GHOST 1001 (see FIG. 10). If there still are no reports within a predefined duration of time, MON removes all information related to the coverage area from the database.

Figure 10:
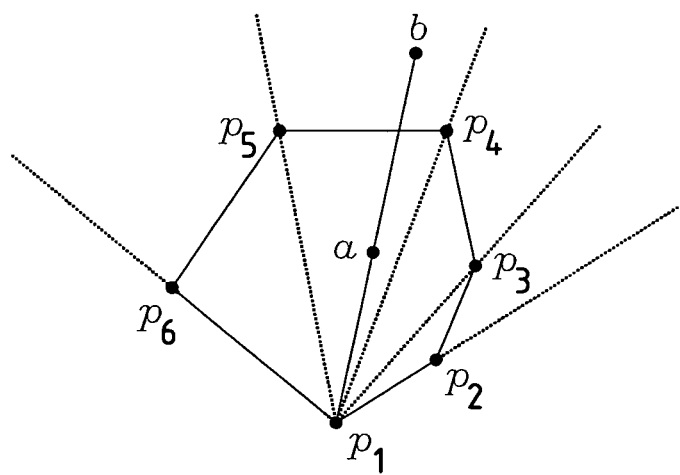
FIG. 10: a schematic illustration of a point lying within a polygon and a further point lying outside a polygon.

It should be noted that some or all of the states of FIGS. 9 and 10 and potential further states may also be applied at system level. The whole system 1 of FIG. 1 may for instance be set into, say, INITIAL mode indicating that all reports shall be maintained regardless of other aspects. Such a mode may be set, for example, after a reset of RDB 13. Similarly, also a "BUSY" mode may be assigned. In such a mode, reports might be dropped randomly, for example. The system or parts thereof may also be set to DO NOT COLLECT state to avoid collection of reports. This may for instance be performed for the base stations of a specific operator due to business or legal reasons.

The following appendices describe exemplary algorithmic details of the present invention and are to be understood as part of the disclosure.

APPENDIX A.1

Point Inside a Rectangle

Checking if a point (x,y) is within a rectangle defined by $x_{min}, y_{min}$ and $x_{max}, y_{max}$ requires 4 operations:

if $x \le x_{max}$ and $x \ge x_{min}$ and $y \le y_{max}$ and $y \ge y_{min}$ return true.

APPENDIX A.2

Point Inside a Matrix-Form Ellipse

Checking if a point x is within an ellipse with center c and matrix $$A = \begin{bmatrix} a & b \\ b & d \end{bmatrix};$$

$(x-c)^T A(x-c) \le 1$.

This may be implemented as follows:

| | Operations |
|---|---|
| $\Delta x_1 := x_1 - c_1$ | 1 |
| $\Delta x2 := x_2 - c_2$ | 1 |
| $r := \Delta x^2_1 a + 2\Delta x_1 \Delta x_2 b + \Delta x^2_2 d$ | 11 |
| if $r \le 1$ return true | 1 |
| | 14 |

APPENDIX A.3

Maximum Box within an Ellipse

Let the ellipse be defined as $(x-c)^T A(x-c) \le 1$, with $$A = \begin{bmatrix} a & b \\ b & d \end{bmatrix}$$

and the center of the ellipse given as $c=(c_1, c_2)$. Then the maximal inscribed symmetric rectangle is computed as $$L = \frac{1}{2(ad + |b|\sqrt{ad})}$$

$$\Delta_1 = \sqrt{Ld}$$

$$\Delta_2 = \sqrt{La}$$

$$B = [c_1 - \Delta_1, c_1 + \Delta_1] \times [c_2 - \Delta_2, c_2 + \Delta_2] \ldots$$

Therein, $c_1 - \Delta_1$ and $c_1 + \Delta_1$ define the left and right boundaries of the rectangle, and $c_2 - \Delta_2$ and $c_2 + \Delta_2$ define the lower and upper boundaries of the rectangle, respectively.

APPENDIX A.4

Coordinate and Ellipse Conversions

Straight lines on Earth are defined as those following the great circles (i.e. the circles on the surface of the earth dividing the Earth into two equal hemisphere so that the centre of the Earth lies on the plane defined by the great circles), and there is a difference between them and the straight lines in geodetic coordinates. These are luckily negligible for small coverage areas. At latitudes less than 80°, this error is less than 3 m for coverage areas with 5 km diameter, and less than 150 m for coverage area with 35 km diameter.

At latitude $\phi$, the length of one meter in East/North directions in degrees is:

$$s_E(\phi) = \frac{180}{\pi} \frac{\sqrt{1 - e^2 \sin(\phi)^2}}{a \cos(\phi)} \text{ degrees/meter}$$

-continued $$s_N(\phi) = \frac{180}{\pi} \frac{(1 - e^2\sin(\phi)^2)^{\frac{3}{2}}}{a(1 - e^2)} \text{ degrees/meter,}$$

where a and e are the WGS-84 semi-major axis and eccentricity of Earth.

Then a local conversion from 2D geodetic coordinates ($\phi$, $\lambda$) to Cartesian East-North coordinates (x, y) with origin at ($\phi_0$, $\lambda_0$) is $$\begin{bmatrix} x \\ y \end{bmatrix} = M \begin{bmatrix} \phi - \phi_0 \\ \lambda - \lambda_0 \end{bmatrix} \quad (1)$$

where $$M = \begin{bmatrix} 0 & s_E^{-1}(\phi_0) \\ s_N^{-1}(\phi_0) & 0 \end{bmatrix},$$

Conversion Between Axis/Angle-Form and Matrix-Form Ellipses

The centers of the axis/angle-form and the matrix-form ellipses are the same. Given an axis/angle-form ellipse with semi-axes with radii $r_1$ and $r_2$ (in meters), and clock-wise angle $\theta$ between first semiaxis and North, the corresponding matrix form is $$A = M^T \begin{bmatrix} \sin(\theta) & \cos(\theta) \\ \cos(\theta) & -\sin(\theta) \end{bmatrix} \begin{bmatrix} r_1^{-2} & 0 \\ 0 & r_2^{-2} \end{bmatrix} \begin{bmatrix} \sin(\theta) & \cos(\theta) \\ \cos(\theta) & -\sin(\theta) \end{bmatrix} M. \quad (2)$$

Conversely, given the matrix A, the corresponding semi-axis lengths and rotation angle of the axis/angle-form ellipse are $$r_1 = \sqrt{\text{first eigenvalue of } MA^{-1}M^T}$$

$$r_2 = \sqrt{\text{second eigenvalue of } MA^{-1}M^T}$$

$$\theta = a\tan 2(v_1, v_2)$$

where v is the eigenvector of $MA^{-1}M^T$ corresponding to its first eigenvalue, and the a tan 2-function denotes the arc tangent taking the quadrants into account.

APPENDIX A.5

Testing if a Point is in a Convex Polygon

Model a coverage area as a convex polygon with vertices $p_1, \ldots, p_n$, where vertices are in counterclockwise order. For simplicity, cyclic indexing of vertices $p_i = p_{i+kn}$ is used, where k is a non-negative integer to represent cyclicity.

$$P = \{x | \forall i; 1 \le i \le n : (x - p_{i-1}) \times (p_i - p_{i-1}) \le 0\},$$

where x is the "two-dimensional cross-product"

$$x \times y = x_1 y_2 - x_2 y_1,$$

and $x = (x_1, x_2)$ and $y = (y_1, y_2)$.

The two-dimensional cross-product may be used to see if a point q is on left or right side of a line from $p_i$ to $p_j$. If $(q-p_i) \times (p_i-p_j) = a$ and $a<0$ then q is on the left side. If $a>0$ then q is on the right side and if $a=0$ then q is on the line.

Testing if a point q is inside a convex polygon can be done in log(n) time using binary search for testing in which sector of polygon the point q lies.

This is schematically illustrated in FIG. 10, wherein point (a) is inside the convex polygon, and point (b) is outside. The polygon is defined by its n=6 vertices $p_1, \ldots, p_6$. An according algorithm is given below:

| 2D cross product | |
|---|---|
| | Operations |
| result := $x_1 y_2 - x_2 y_1$ | 3 |
| Is q inside convex polygon $p_1, \ldots p_n$, with $p_{n+1} = p_1$ | |
| lo := 1 | |
| hi := n + 1 | 1 |
| i := $\lfloor$(lo+hi)/2$\rfloor$ | 2 |
| Do | |
|   side := $(p_1 - q) \times (p_i - p_1)$ | 7 |
|   if side < 0 | 1 |
|     hi := I | |
|   Else | |
|     lo := i | |
|   End | |
|   i := $\lfloor$(lo+hi)/2$\rfloor$ | 2 |
| until hi-lo = 1 | 2 |
| side := $(p_{lo} - q) \times (p_{hi} - p_{lo})$ | 7 |
| if side < 0 return false | 1 |
| return true | |
| | 11+12j, j≈log2(n) |
| | n=10 → j≈4 → 59 |

APPENDIX A.6

Point Inside an Axis/Angle-Form Ellipse

Used Symbols:
$\theta$ angle
$r_1$ semi-major radius in meters
$r_2$ semi-minor radius in meters
$\phi_0$ latitude of center of ellipse
$\lambda_0$ longitude of center of ellipse
$\phi$ latitude of point
$\lambda$ longitude of point
$a_0$ semi-major axis of earth
$e^2$ squared eccentricity of Earth
$180/\pi$ conversion factor from radians to degrees Angles are in degrees and trigonometric functions are also degree versions. All arithmetic operations are counted as one and assignment is considered to not take any time.

| Parameters $s_E$ & $s_N$: | Operations |
|---|---|
| $u := \sqrt{1-e^2\sin(\phi_0)^2}$ | 5 |
| $s_E := \frac{180}{\pi} \frac{u}{a_0\cos(\phi_0)}$ | 4 |
| $s_N := \frac{180}{\pi} \frac{u^3}{a_0(1-e^2)}$ | 5 |
| subtotal | 14 |
| Elements of matrix A: | Operations |
| $a := \frac{\left(\frac{\cos(\theta)}{r_1}\right)^2 + \left(\frac{\sin(\theta)}{r_2}\right)^2}{s_N^2}$ | 9 |
| $b := \frac{\sin\theta\cos\theta}{s_E s_N}(r_1^{-2} - r_2^{-2})$ | 9 |

| | | |
|---|---|---|
| $c := \dfrac{\left(\dfrac{\sin(\theta)}{r_1}\right)^2 + \left(\dfrac{\cos(\theta)}{r_2}\right)^2}{s_E^2}$ | 9 | |
| subtotal | 27 | |
| Inside ellipse: | Operations | |
| $\Delta x_1 := \phi_0 - \phi$ | 1 | |
| $\Delta x_2 := \lambda_0 - \lambda$ | 1 | |
| $r := \Delta x_1^2 a + 2\Delta x_1 \Delta x_2 b + \Delta x_2^2 d$ | 11 | |
| if $r \le 1$ return false | 1 | |
| subtotal | 14 | |
| total | 55 | |

It is readily clear for a person skilled in the art that the logical blocks in the schematic block diagrams as well as the flowchart and algorithm steps presented in the above description and its appendices may at least partially be implemented in electronic hardware and/or computer software, wherein it may depend on the functionality of the logical block, flowchart step and algorithm step and on design constraints imposed on the respective devices to which degree a logical block, a flowchart step or algorithm step is implemented in hardware or software. The presented logical blocks, flowchart steps and algorithm steps may for instance be implemented in one or more digital signal processors (DSPs), application specific integrated circuits (ASICs), field programmable gate arrays (FPGAs) or other programmable devices. The computer software may be stored in a variety of computer-readable storage media of electric, magnetic, electro-magnetic or optic type and may be read and executed by a processor, such as for instance a microprocessor. To this end, the processor and the storage medium may be coupled to interchange information, or the storage medium may be included in the processor.

The invention has been described above by means of embodiments, which shall be understood to be exemplary and non-limiting. In particular, it should be noted that there are alternative ways and variations which are obvious to a skilled person in the art and can be implemented without deviating from the scope and spirit of the appended claims. It should also be understood that the sequence of all method steps presented above is not mandatory, also alternative sequences may be possible.

The invention claimed is:

1. An apparatus comprising:
a processor, and
a memory, said memory storing a program comprising program code, said program configured to cause said apparatus, when said program is executed on said processor,
to perform pre-filtering of information, which information is a report that contains a position of a terminal that is able to hear a communication node, by determining whether said information shall be discarded or made available to a process that comprises generating and/or updating at least one model for a coverage area of said communication node based on a plurality of reports from one or more terminals that report their respective positions and respective lists of one or more communications nodes that can be heard at said respective positions,
wherein said determining is based on at least one model for said coverage area of said communication node produced by said process,
wherein said determining comprises checking if said position of said terminal is covered by said at least one model on which said determining is based and discarding said information or making said information available to said process at least partially based on an outcome of said checking, and
wherein said at least one model on which said determining is based, differs from at least one further model that is produced by said process at least in its format so that said checking if said position is covered by said at least one model on which said determining is based is less complex than a checking if said position is covered by said at least one further model.

2. The apparatus according to claim 1, wherein said information is discarded if said position of said terminal is covered by said at least one model on which said determining is based.

3. The apparatus according to claim 1, wherein at least one model of said at least one model on which said determining is based is a rectangular model, an elliptical model or a polygonal model.

4. The apparatus according to claim 3, wherein said rectangular model defines a rectangle that is considered to be completely within said coverage area of said communication node or a rectangle that is considered to completely enclose said coverage area of said communication node.

5. The apparatus according to claim 3, wherein said at least one model of said at least one model on which said determining is based is an elliptical model, and wherein said elliptical model describes an ellipse by the matrix $$A = \begin{bmatrix} a & b \\ b & d \end{bmatrix}$$

with parameters a>0, d>0 and b and the two-dimensional centre position c so that a two-dimensional position x is within the ellipse if $(x-c)^T A(x-c) \le 1$.

6. The apparatus according to claim 1, wherein said determining is based on at least one of one or more determination rules and a state machine, and wherein at least two states of said state machine are associated with different determination rules of said one or more determination rules, respectively.

7. The apparatus according to claim 6, wherein a determination rule of said one or more determination rules requires that no information shall be discarded.

8. The apparatus according to claim 6, wherein said at least one model on which said determining is based is a first-type model for said coverage area of said communication node, and wherein a determination rule of said one or more determination rules requires that said information shall be discarded if said position of said terminal is covered by said first-type model for said coverage area of said communication node produced by said process, that said information shall be discarded if said position of said terminal is not covered by said first-type model but is covered by a second-type model for said coverage area of said communication node produced by said process, and that said information shall be made available to said process otherwise.

9. The apparatus according to claim 6, wherein a determination rule of said one or more determination rules requires that said information shall be made available to said process if a position contained in said information is not covered by a model for said coverage area of said communication node produced by said generating/updating process, and that, if said position contained in said information is covered by said model, said information shall be discarded randomly according to a pre-defined probability criterion and otherwise maintained.

10. The apparatus according to claim 1, wherein said apparatus further comprises a user interface, IP connectivity or a memory.

11. The apparatus according to claim 1, wherein said at least one model for said coverage area of said communication node is a geometrical model.

12. The apparatus according to claim 1, wherein said at least one model for said coverage area of said communication node is based on a geometrical object representative of respective positions of those terminals of said one or more terminals that reported that they heard said communication node at said respective positions.

13. The apparatus according to claim 1, wherein said at least one further model is a model that is to be provided to at least one terminal for use in position finding or is a model that is used to represent and/or store said coverage area of said communication node in said process.

14. A method, performed by an apparatus, comprising:
pre-filtering information, which information is a report that contains a position of a terminal that is able to hear a communication node, by determining whether said information shall be discarded or made available to a process that comprises generating and/or updating at least one model for a coverage area of said communication node based on a plurality of reports from one or more terminals that report their respective positions and respective lists of one or more communication nodes that can be heard at said respective positions
wherein said determining is based on at least one model for said coverage area of said communication node produced by said process,
wherein said determining comprises checking if said position of said terminal is covered by said at least one model on which said determining is based and discarding said information or making said information available to said process at least partially based on an outcome of said checking, and
wherein said at least one model on which said determining is based, differs from at least one further model that is produced by said process at least in its format, so that said checking if said position is covered by said at least one model on which said determining is based is less complex than a checking if said position is covered by said at least one further model.

15. The method according to claim 14, wherein at least one model of said at least one model on which said determining is based is at least one of a rectangular model, an elliptical model and or a polygonal model.

16. The method according to claim 14, wherein said determining is based on at least one of one or more determination rules and a state machine, and wherein at least two states of said state machine are associated with different determination rules of said one or more determination rules, respectively.

17. The method according to claim 14, wherein said at least one model for a coverage area of a communication node is a geometrical model.

18. The method according to claim 14, wherein said at least one model for said coverage area of said communication node is based on a geometrical object representative of respective positions of those terminals of said one or more terminals that reported that they heard said communication node at said respective positions.

19. The method according to claim 14, wherein said at least one further model is a model that is to be provided to at least one terminal for use in position finding or is a model that is used to represent and/or store said coverage area of said communication node in said process.

20. A computer program product comprising a non-transitory computer readable medium having a computer program stored thereon, the computer program comprising program code for performing the following, when said program is executed on a processor:
pre-filtering information, which information is a report that contains a position of a terminal that is able to hear a communication node, by determining whether said information shall be discarded or made available to a process that comprises generating and/or updating at least one model for a coverage area of said communication node based on a plurality of reports from one or more terminals that report their respective positions and respective lists of one or more communication nodes that can be heard at said respective positions,
wherein said determining is based on at least one model for said coverage area of said communication node produced by said process,
wherein said determining comprises checking if said position of said terminal is covered by said at least one model on which said determining is based and discarding said information or making said information available to said process at least partially based on an outcome of said checking, and
wherein said at least one model on which said determining is based differs from at least one further model that is produced by said process at least in its format so that said checking if said position is covered by said at least one model on which said determining is based is less complex than a checking if said position is covered by said at least one further model.

* * * * *